United States Patent
Harada et al.

(10) Patent No.: US 11,206,694 B2
(45) Date of Patent: Dec. 21, 2021

(54) USER TERMINAL, RADIO BASE STATION, AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Kazuaki Takeda, Tokyo (JP); Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/072,326

(22) PCT Filed: Jan. 25, 2017

(86) PCT No.: PCT/JP2017/002422
§ 371 (c)(1),
(2) Date: Jul. 24, 2018

(87) PCT Pub. No.: WO2017/130989
PCT Pub. Date: Aug. 3, 2017

(65) Prior Publication Data
US 2019/0037609 A1    Jan. 31, 2019

(30) Foreign Application Priority Data

Jan. 29, 2016 (JP) .............................. JP2016-016193

(51) Int. Cl.
*H04W 74/08* (2009.01)
*H04W 72/02* (2009.01)
(Continued)

(52) U.S. Cl.
CPC ...... *H04W 74/0841* (2013.01); *H04B 7/0695* (2013.01); *H04J 11/0073* (2013.01);
(Continued)

(58) Field of Classification Search
CPC ............ H04W 74/0841; H04W 24/10; H04W 56/003; H04W 72/02; H04W 74/08;
(Continued)

(56) References Cited

U.S. PATENT DOCUMENTS

2009/0186613 A1* 7/2009 Ahn ..................... H04W 72/042
455/434
2011/0305268 A1* 12/2011 Lindoff ................ H04B 17/336
375/227

(Continued)

FOREIGN PATENT DOCUMENTS

| WO | 2015/080649 A1 | 6/2015 |
| WO | 2015140838 A1 | 9/2015 |
| WO | 2015/166840 A1 | 11/2015 |

OTHER PUBLICATIONS

ETSI TS 136 211 V8.3.0 "LTE: Evolved Universal Terrestrial Radio Access (E-UTRA);Physical channels and modulation", Nov. 2008, pp. 1-87.*
(Continued)

*Primary Examiner* — Sophia Vlahos
(74) *Attorney, Agent, or Firm* — Osha Bergman Watanabe & Burton LLP

(57) ABSTRACT

It is one of the objects to achieve an appropriate communication in a next generation communication system. The user terminal according to one aspect of the present invention includes a receiving section that receives a synchronization signal and a transmitting section that uses a sequence and/or a radio resource determined based on the synchronization signal to transmit a random access preamble.

7 Claims, 13 Drawing Sheets

(51) Int. Cl.
  *H04W 88/02* (2009.01)
  *H04B 7/06* (2006.01)
  *H04J 11/00* (2006.01)
  *H04W 24/10* (2009.01)
  *H04W 56/00* (2009.01)

(52) U.S. Cl.
  CPC ......... *H04W 24/10* (2013.01); *H04W 56/003* (2013.01); *H04W 72/02* (2013.01); *H04W 74/08* (2013.01); *H04W 88/02* (2013.01)

(58) Field of Classification Search
  CPC ... H04W 88/02; H04B 7/0695; H04B 7/0621; H04B 7/0628; H04B 7/063; H04J 11/0073; H04L 27/2655
  See application file for complete search history.

(56) References Cited

U.S. PATENT DOCUMENTS

| | | | |
|---|---|---|---|
| 2014/0169335 A1* | 6/2014 | Franklin | H04W 8/082 370/332 |
| 2016/0192401 A1* | 6/2016 | Park | H04W 74/0833 370/329 |
| 2016/0277225 A1* | 9/2016 | Frenne | H04W 56/0015 |
| 2016/0302090 A1* | 10/2016 | Parkvall | H04B 7/068 |
| 2017/0033912 A1* | 2/2017 | Onggosanusi | H04B 7/0626 |
| 2017/0048810 A1* | 2/2017 | Sahlin | H04L 5/0048 |
| 2017/0048826 A1 | 2/2017 | Kishiyama | |
| 2017/0141833 A1* | 5/2017 | Kim | H04B 7/0626 |
| 2017/0201974 A1* | 7/2017 | Sohn | H04W 72/0413 |
| 2017/0257230 A1* | 9/2017 | Son | H04B 7/0695 |
| 2018/0343043 A1* | 11/2018 | Hakola | H04B 7/0417 |
| 2018/0359790 A1* | 12/2018 | Ingale | H04W 28/16 |

OTHER PUBLICATIONS

International Search Report issued in PCT/JP2017/002422 dated Apr. 25, 2017 (1 page).
Written Opinion of the International Searching Authority issued in PCT/JP2017/002422 dated Apr. 25, 2017 (3 pages).
3GPP TS 36.300 V8.10.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Sep. 2009 (147 pages).
Office Action issued in counterpart European Patent Application No. 17744219.1, dated Jul. 19, 2019 (9 Pages).
Office Action issued in Indian Application No. 201817025953; dated Feb. 19, 2021 (6 pages).
Office Action issued in Japanese Application No. 2017-564281; dated Apr. 27, 2021 (6 pages).

* cited by examiner

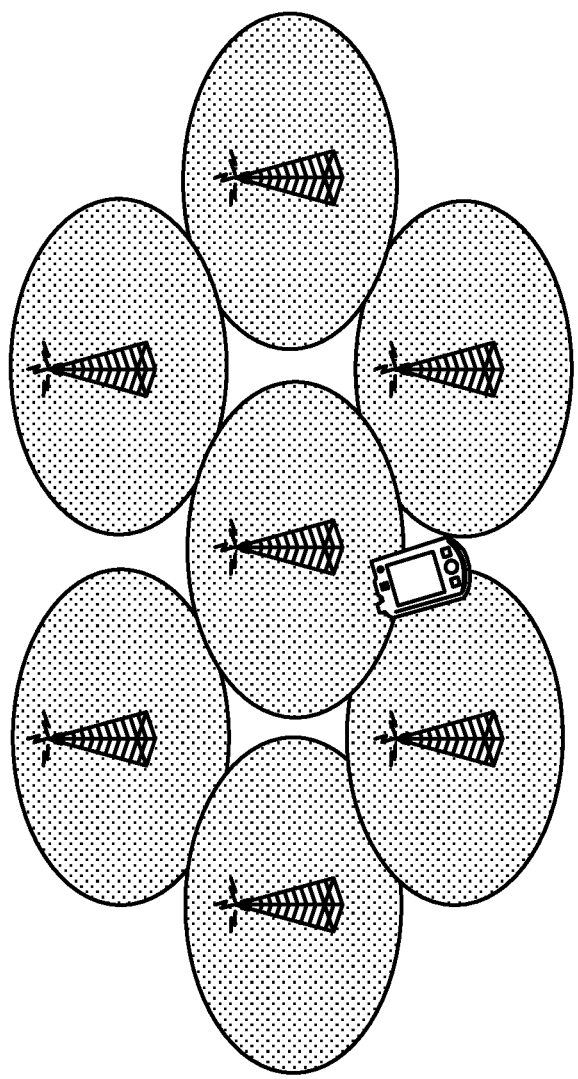
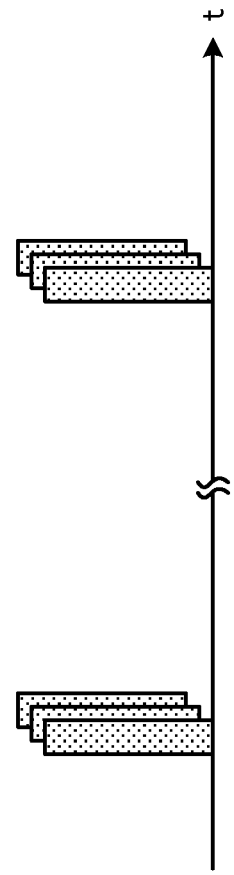
FIG. 6A
FIG. 6B

USER TERMINAL, RADIO BASE STATION, AND RADIO COMMUNICATION METHOD

TECHNICAL FIELD

The present invention relates to a user terminal, a radio base station, and a radio communication method in a next generation mobile communication system.

BACKGROUND ART

In Universal Mobile Telecommunications System (UMTS) networks, for the purpose of higher data rates, low latency, and the like, Long Term Evolution (LTE) has been specified (Non-Patent Literature 1). For the purpose of achieving further broadbandization and increased speed beyond LTE (in other words, LTE Rel. 8 or 9), LTE-ADVANCED (in other words, LTE-A or LTE Rel. 10, 11, or 12) is specified, and a succeeding system of LTE (in other words, for example, Future Radio Access (FRA), 5th generation mobile communication system (5G), or LTE Rel. 13 or Rel. 14) is also examined.

In LTE Rel.10/11, for broadbandization, Carrier Aggregation (CA) that aggregates a plurality of Component Carriers (CCs) has been introduced. Each CC is constituted with a system band of LTE Rel.8 as one unit. In the CA, a plurality of CCs in an identical radio base station (eNB: eNodeB) are configured at a user terminal (UE: User Equipment).

On the other hand, in LTE Rel. 12, Dual Connectivity (DC) where a plurality of Cell Groups (CGs) in different radio base stations are configured at UE has been also introduced. Each cell group is constituted of at least one cell (CC). In the DC, the plurality of CCs in the different radio base stations are aggregated. Thus, the DC is also referred to as, for example, CA between the base stations (Inter-eNB CA).

In LTE Rel.8 to 12, Frequency Division Duplex (FDD) that performs Downlink (DL) transmission and Uplink (UL) transmission with different frequency bands, and Time Division Duplex (TDD) that performs the Downlink transmission and the Uplink transmission with an identical frequency band by temporally switching them have been introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

For a future wireless communication system (for example, 5G), it has been examined to use a wide band frequency spectrum in order to satisfy requests, such as an ultra-high speed, a large capacity, and an ultra-low latency. For the future radio communication system, it has been requested to handle an environment in which an enormous number of devices simultaneously couple to the network.

For example, in the future radio communication system, it is assumed to perform communication with a high frequency band (for example, tens of GHz) with which a wide band is easily ensured, and communication with a relatively small communication amount used for usages, such as Internet of Things (IoT), Machine Type Communication (MTC), and Machine To Machine (M2M). A demand for Device To Device (D2D) and Vehicular To Vehicular (V2V) communication where low-latency communication is required is increasing.

In order to satisfy requests for the above-described various communications, it has been examined to design a new communication access system (may be referred to as, for example, 5G Radio Access Technology (RAT) and New RAT) that is appropriate for a high frequency band. However, in the case where a radio communication method used in an existing radio communication system (for example, LTE Rel. 8 to 12) is directly applied to the new communication access system, the appropriate communication possibly fails due to a generation of a deterioration in frequency usage efficiency, a delay in communication, and the like.

The present invention is made in view of such respects, and it is one of the objects to provide a user terminal, a radio base station, and a radio communication method that ensure achieving an appropriate communication in the next generation communication system.

Solution to Problem

A user terminal according to one aspect of the present invention includes a receiving section that receives a synchronization signal and a transmitting section that uses a sequence and/or a radio resource determined based on the synchronization signal to transmit a random access preamble.

Advantageous Effects of Invention

The present invention can achieve an appropriate communication in a next generation communication system.

BRIEF DESCRIPTION OF DRAWINGS

FIG. 6A and FIG. 6B are drawings illustrating exemplary transmission patterns of the synchronization signals transmitted at Step ST1 in the case where N=1.

DESCRIPTION OF EMBODIMENTS

As an access system (may be referred to as, for example, 5G RAT and New RAT) used in a new communication system of the future, it has been examined an extension of an access system (may be referred to as, for example, LTE RAT and LTE-Based RAT) used in an existing LTE/LTE-A system.

In 5G RAT, a different radio frame and/or a different sub-frame structure from those in LTE RAT may be used. For example, the radio frame structure of 5G RAT can be a radio frame structure in which at least one of a sub-frame length, a symbol length, a subcarrier spacing, and a system bandwidth is different compared with an existing LTE (LTE Rel. 8 to 12).

The sub-frame may be referred to as Transmission Time Interval (TTI). For example, a TTI (sub-frame) length in LTE Rel. 8 to 12 is 1 ms and constituted of two time slots. The TTI is a transmission time unit of a channel-coded data packet (transport block). The TTI is a processing unit of, for example, scheduling and a link adaptation.

More specifically, while in 5G RAT, a radio parameter is newly determined, it has been examined a method, for example, in which a communication parameter (for example, the subcarrier spacing, the bandwidth, and the symbol length) that specifies the radio frame of LTE is used by being multiplied by constant multiplication (for example, N times and 1/N times) based on a numerology of LTE RAT. Here, the numerology means a set of the communication parameters that characterize a design of a signal in a certain RAT and a design of RAT. A plurality of the numerologies may be specified and used for one RAT.

The plurality of numerologies being different represents a case in which, for example, at least one of the following (1) to (6) is different, but not limited to the following: (1) the subcarrier spacing, (2) Cyclic Prefix (CP) length, (3) the symbol length, (4) the number of symbols per TTI, (5) the TTI length, and (6) filtering process and windowing process.

5G RAT targets a considerably wide frequency (for example, 1 GHz to 100 GHz) as a carrier frequency. Therefore, it is considered that the plurality of numerologies having different symbol lengths, subcarrier spacings, and the like are supported in accordance with a condition requested for each usage and they coexist. As an exemplary numerology employed by 5G RAT, it is considered a constitution in which the subcarrier spacing and the bandwidth are multiplied by N (for example, N>1) and the symbol length is multiplied by 1/N using LTE RAT as a reference.

Figure 1:
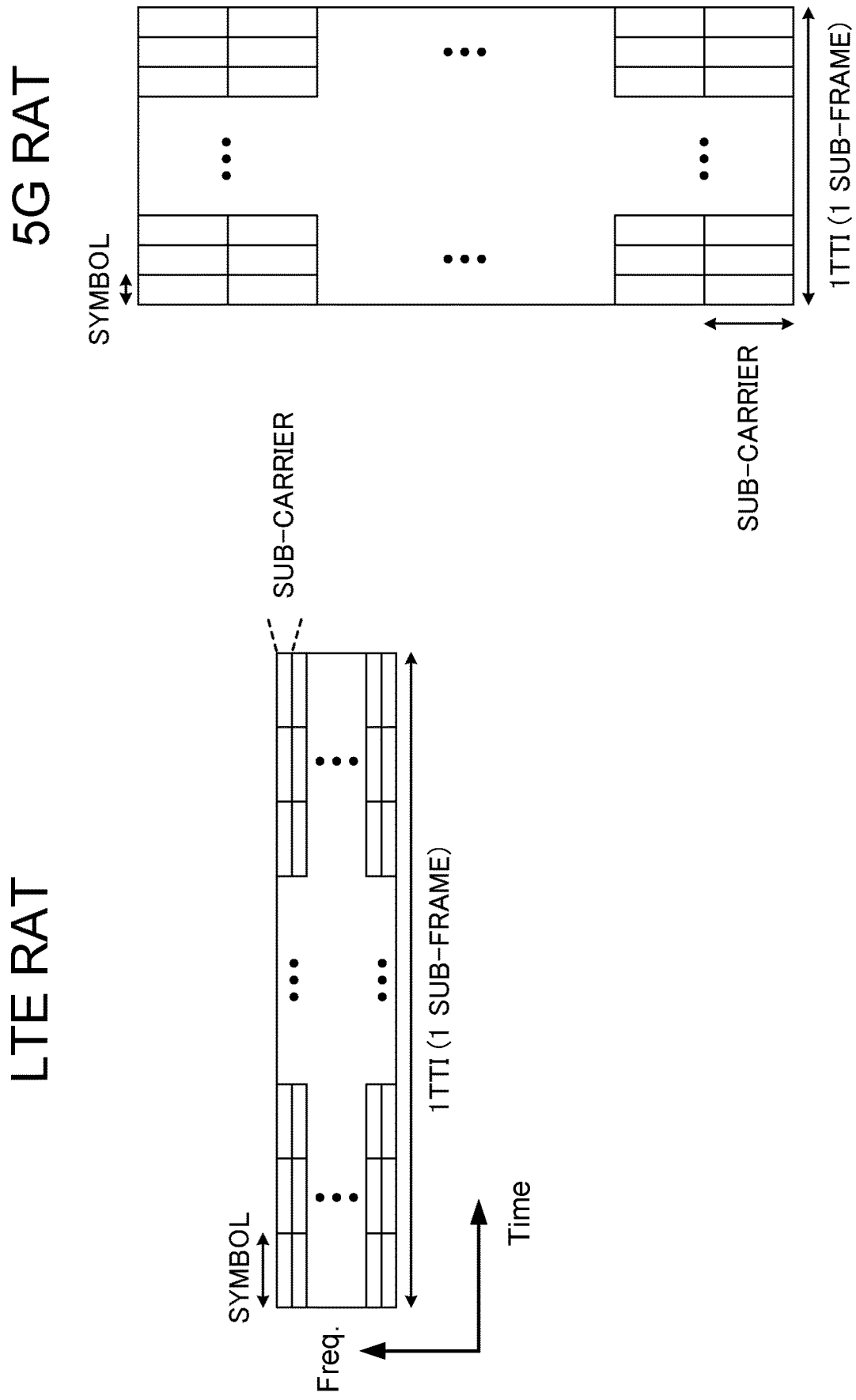
FIG. 1 is a drawing illustrating exemplary LTE RAT sub-frame structure and 5G RAT sub-frame structure.

FIG. 1 is a drawing illustrating an exemplary sub-frame structure of LTE RAT and an exemplary sub-frame structure of 5G RAT. LTE RAT illustrated in FIG. 1 uses an existing LTE sub-frame structure whose control unit is made of 1 ms (14 Orthogonal Frequency Division Multiplexing (OFDM) symbols/Single-Carrier Frequency Division Multiple Access (SC-FDMA) symbols) and 180 kHz (12 subcarriers).

5G RAT illustrated in FIG. 1 uses a sub-frame structure (TTI constitution) whose subcarrier spacing is large and symbol length is short compared with LTE RAT. Shortening the TTI length reduces a controlling process delay, and a delay time can be reduced. A TTI (for example, a TTI less than 1 ms) that is shorter than the TTI used in LTE may be referred to as a reduced TTI.

With the constitution of 5G RAT in FIG. 1, since the TTI length can be shortened, a time for transmitting/receiving can be shortened, thus easily achieving a low latency. Making the subcarrier spacing and the system bandwidth large compared with the existing LTE can reduce an influence of phase noise in a high frequency band. This ensures preferably achieving a high speed communication using, for example, a massive Multiple Input Multiple Output (MIMO) that uses ultra-wideband multielement antennas by introducing the high frequency band (for example, tens of GHz band), which can easily ensure the wide band, to 5G RAT.

The ultra-wideband multielement antenna can form a beam (antenna directionality) by controlling amplitude and/or a phase of a signal transmitted/received from each of elements. This process is also referred to as Beam Forming (BF) and can reduce a radio wave propagation loss.

As another exemplary numerology, a constitution in which the subcarrier spacing and the bandwidth are multiplied by 1/N and the symbol length is multiplied by N is considered. With this constitution, since the whole length of the symbol increases, the CP length can be increased even in the case where a proportion of the CP length in the whole length of the symbol is constant. This ensures a stronger (robust) radio communication against a fading in a communication channel.

In 5G RAT, the control unit is not limited to an existing one Resource Block (RB) pair (14 symbols×12 subcarriers). For example, the control unit may be a new and predetermined region unit (may be referred to as, for example, an enhanced RB (eRB)) specified as a radio resource region different from the existing one RB, and may be a plurality of RB units.

Even in the case where a plurality of different numerologies are supported, it is preferable that a physical channel constitution, a used frequency, and the like are common as far as possible.

Figure 2A:
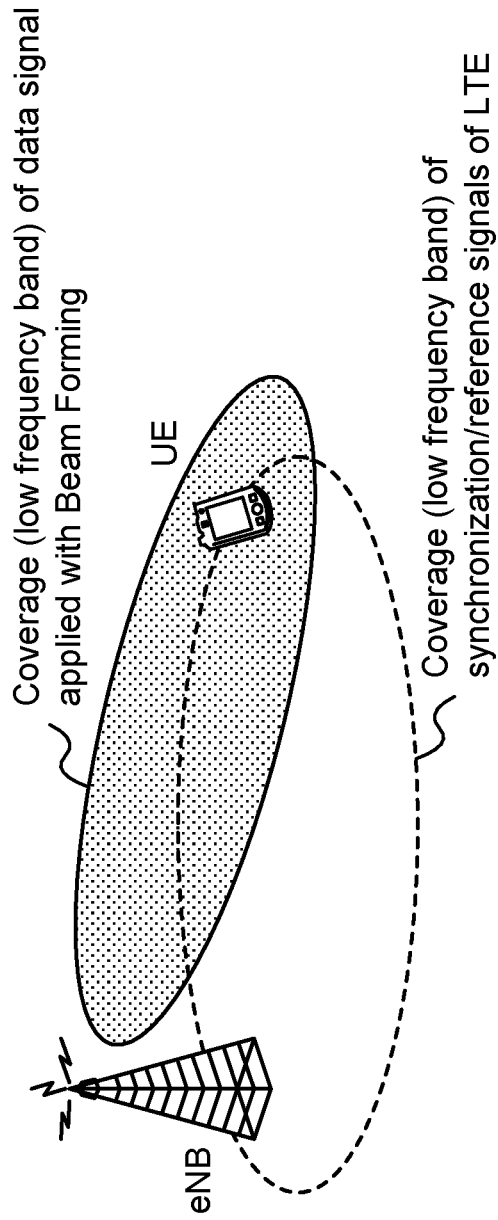
FIG. 2A and FIG. 2B are drawings illustrating exemplary coverages of data signals and synchronization signals in a conventional LTE.
Figure 2B:
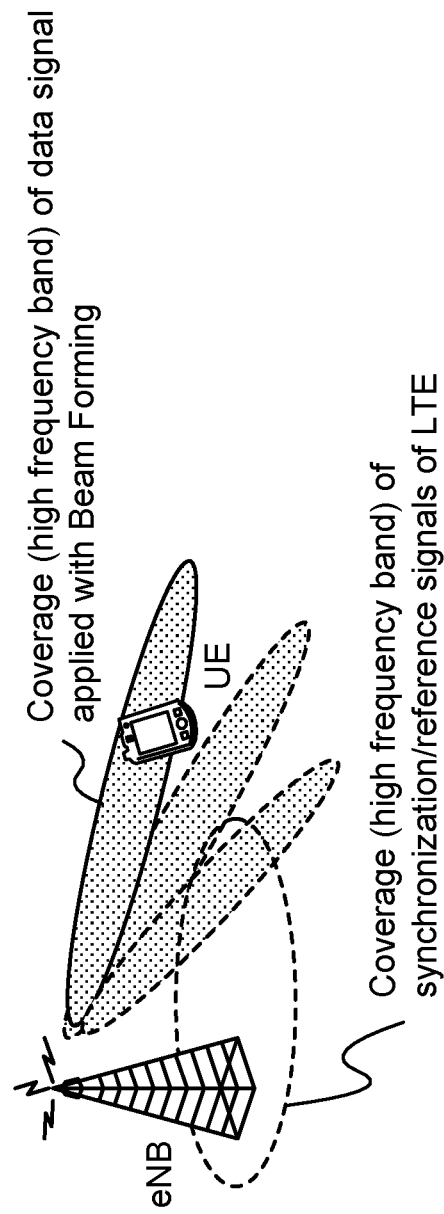

In the conventional LTE, while a part of signals, such as a data signal, can be transmitted applying MIMO and Beam Forming techniques, the application of a highly directional beam has not been considered for a synchronization signal and a reference signal that are used for a cell detection and a measurement. FIG. 2 are drawings illustrating exemplary coverages of the data signal and the synchronization signal in the conventional LTE. FIG. 2A illustrates coverages of respective signals in a low frequency band. FIG. 2B illustrates coverages of respective signals in a high frequency band.

As illustrated in FIG. 2, the eNB does not know in advance whereabouts the UE is in the cell. In view of this, in the conventional LTE, the synchronization/reference signals are constituted to be transmitted toward a large indefinite number of UEs without using Beam Forming. Meanwhile, Beam Forming has been applied to the data signal to expand the coverage even in the high frequency band where a radio wave straightness and attenuation increase.

Specifically, in the conventional LTE, the eNB scrambles Primary Synchronization Signal (PSS)/Secondary Synchronization Signal (SSS) as the synchronization signal based on a cell identifier (Cell Identity (cell ID)), and transmits each of the signals at 5 ms intervals. The eNB transmits Cell-Specific Reference Signal (CRS)/Channel State Information-Reference Signal (CSI-RS) as the reference signal used for synchronization and reception quality measurement. The UE estimates a precoding matrix using the CRS and/or the CSI-RS for the eNB to form an appropriate beam for its own terminal and reports to the eNB.

On the other hand, an ultra-high frequency band (for example, 100 GHz) examined for 5G has a possibility that the UE fails to find a 5G base station easily due to an extremely narrowed coverage in the case where the Beam Forming technique is not applied to the synchronization/reference signals. However, applying Beam Forming in order to ensure the coverage of the synchronization/reference signals causes certain directions to receive the strong signals but causes other than the certain directions to be further difficult to receive the signals.

A network (eNB) side not knowing the direction where the UE is at least before the connection makes it impossible to transmit the synchronization/reference signals in the beam toward an appropriate direction only. Therefore, it is considered a method in which a plurality of the synchronization/reference signals having the beams toward different directions are transmitted to make the UE recognize which beam is found. FIG. 3 are drawings illustrating exemplary cases where the plurality of synchronization/reference signals are transmitted in different beams.

Figure 3A:
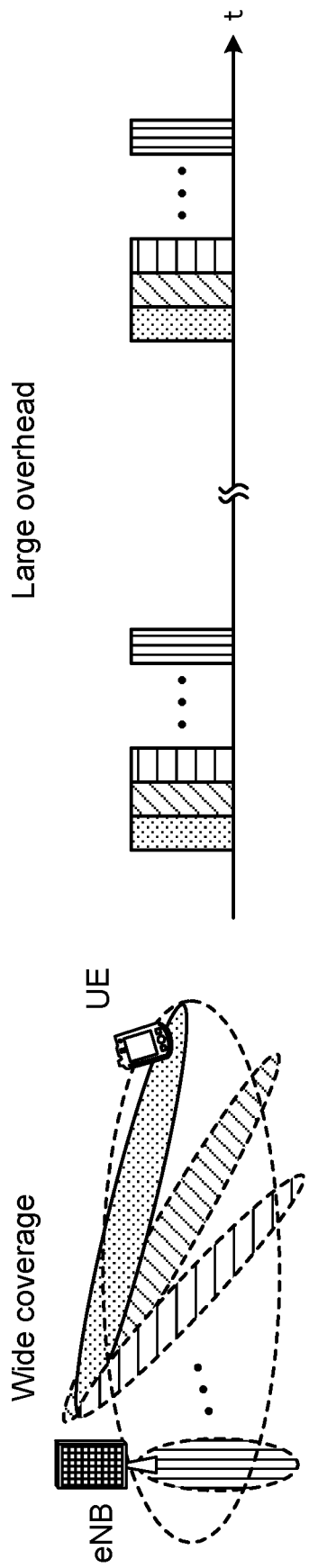
FIG. 3A and FIG. 3B are drawings illustrating exemplary cases where a plurality of synchronization/reference signals are transmitted in different beams.
Figure 3B:
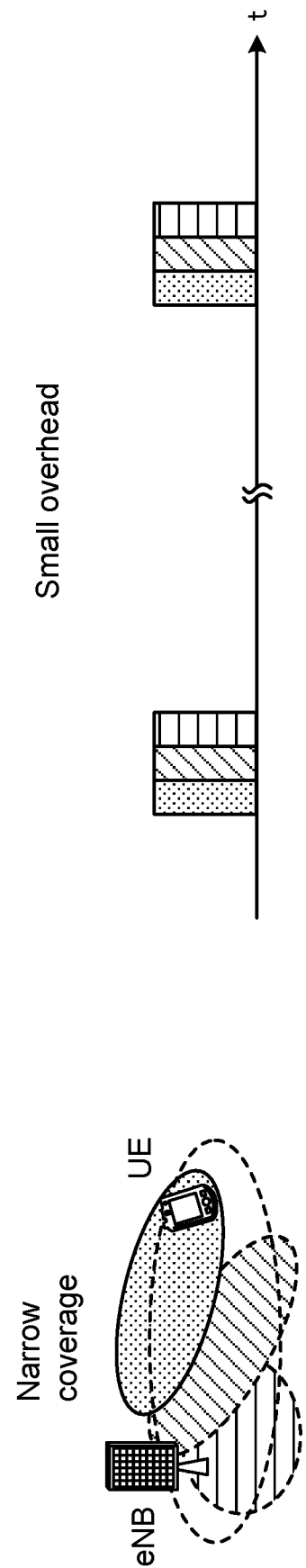

FIG. 3A illustrates an exemplary case where the plurality of synchronization/reference signals are transmitted with respective comparatively thin beams. FIG. 3B illustrates an exemplary case where the plurality of synchronization/reference signals are transmitted in respective comparatively thick beams. When the thin beams attempts to ensure the coverage as illustrated in FIG. 3A, it is necessary to transmit a multiple of beams (many synchronization/reference signals) in a horizontal direction viewing from the eNB. This increases an overhead, thus reducing the frequency usage efficiency. Meanwhile, when the thick beams are used as illustrated in FIG. 3B, the overhead can be reduced but there occurs a problem that the coverage is narrowed since flying distances of the beams cannot extend far.

The above-described beam selection method for the conventional LTE takes long time until the UE determines the beam; therefore it is considered that frequency usage efficiency deteriorates.

Therefore, the inventors of present invention conceived of achieving efficient synchronization/reception quality measurement and beam search operation by compensating a difference of propagation characteristic of each frequency band even in a radio communication system that has a possibility of communicating in a various frequency band, such as 5G Specifically, the inventors of present invention designed appropriate synchronization/reference signals that are usable in a wide frequency band, and found a method for achieving cell detection, measurement, report, and connection establishment on a common framework regardless of the carrier frequencies and the numerologies.

According to one aspect of the present invention, steps, such as a step of narrowing down the beam, a step of reporting the measurement, and a step of random accessing, are integrated to reduce a connecting process delay, and an appropriate communication can be achieved. Performing a synchronization process in a beam unit that eliminates a concept of cell, which is different from a conventional synchronization process in a cell unit, and a measurement process of the reference signal applied with Beam Forming that is user centric ensures achieving a low overhead.

The following describes an embodiment of the present invention in detail with reference to the attached drawings.

In the following embodiment, a synchronization channel (synchronization signal) may be any signal that is used for cell searching. For example, the synchronization signal may be the existing Primary Synchronization Signal (PSS), Secondary Synchronization Signal (SSS), or a discovery signal (Discovery Signal/Discovery Reference Signal (DS/DRS)), may be a signal that extended/changed these synchronization signals (may be referred to as, for example, enhanced PSS (ePSS)/enhanced SSS (eSSS)), or may be a new signal different from these or a combination of at least a part of the above-described signals.

(Radio Communication Method)

A beam search method (an appropriate beam determination method) according to the embodiment of the present invention can be achieved by the following steps:

Step ST1: the eNBs transmits a synchronization signal having a predetermined number (for example, N) of different patterns (constitutions);

Step ST2: the UE determines a resource of a Random Access Preamble (RAP) based on the detected synchronization signal, and transmits the RAP (the eNB performs reception BF to detect a direction from which the RAP is transmitted);

Step ST3: the eNB transmits a Random Access Response (RAR) and the measurement reference signal in a beam direction where the RAP is detected;

Step ST4: the UE transmits a Measurement Report (MR) and a message 3 (the eNB transmits, for example, a message 4); and Step ST5: the eNB performs a further beam adjustment through a CSI process.

Figure 4:
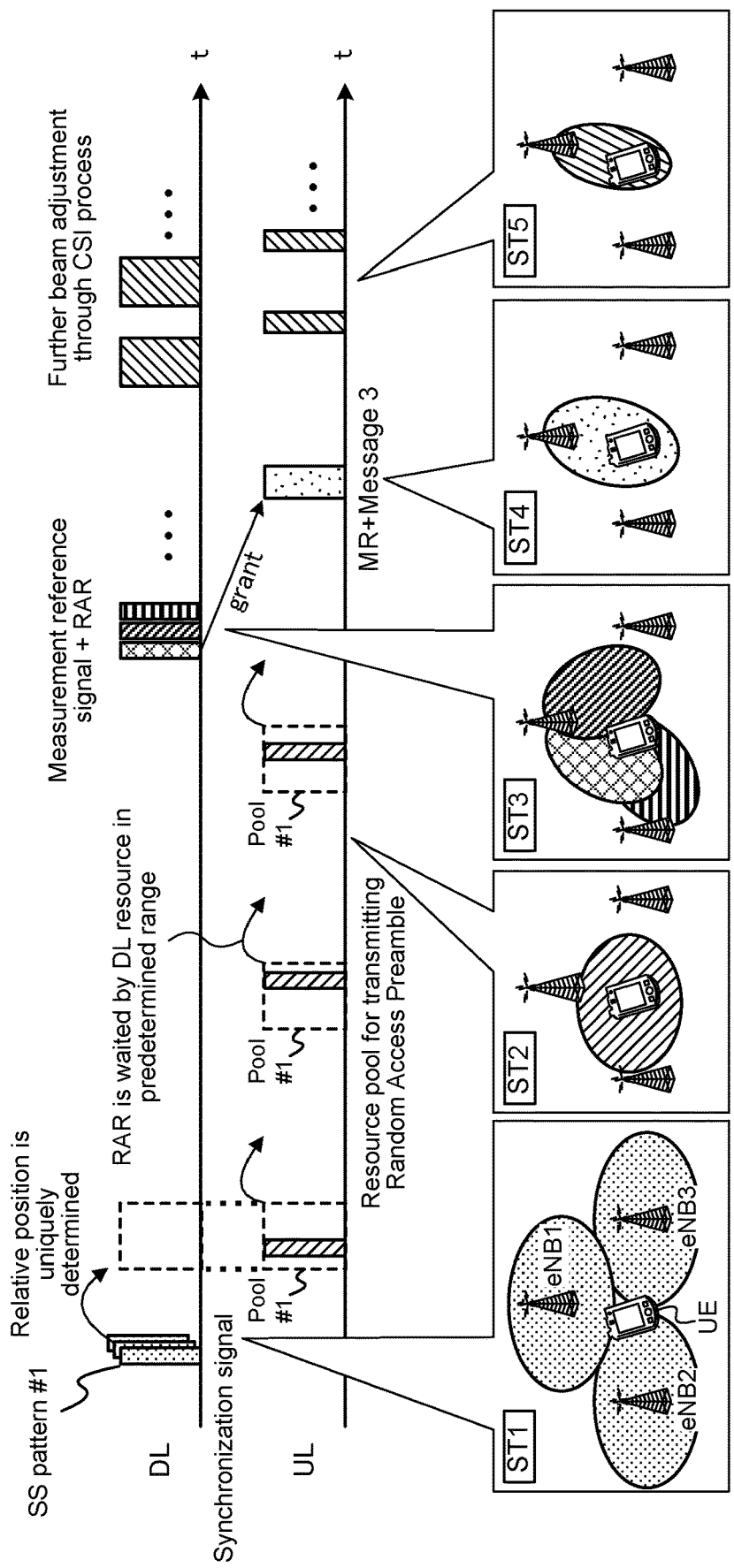
FIG. 4 is a drawing illustrating an exemplary process flow of a method for beam searching according to an embodiment of the present invention in the case where N=1.
Figure 5:
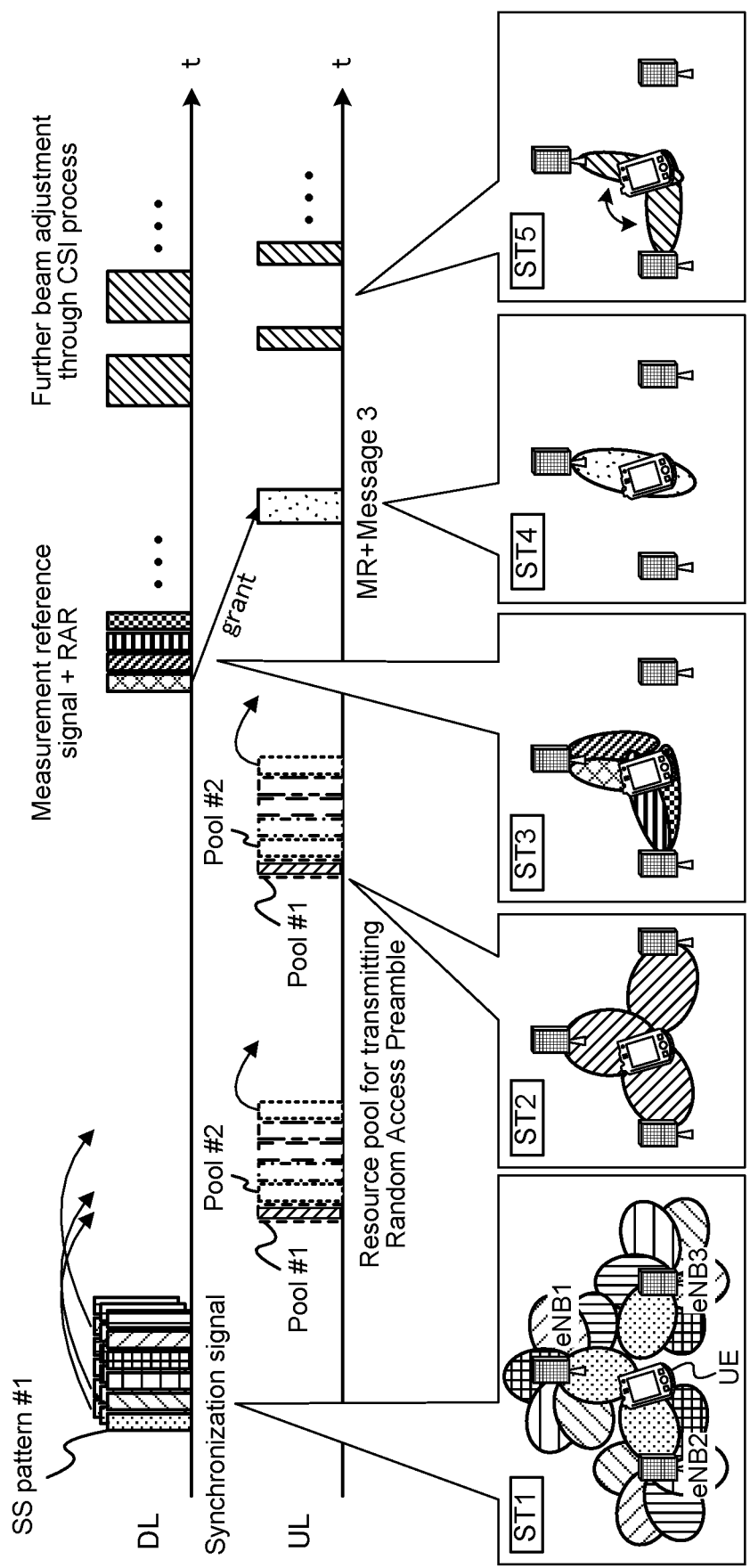
FIG. 5 is a drawing illustrating an exemplary process flow of the method for beam searching according to the embodiment of the present invention in the case where N=6.

The following describes a specific working example with examples in which N in the above-described Step ST1 is N=1 and N=6. FIG. 4 and FIG. 5 are drawings illustrating exemplary process flows of methods for beam searching according to the embodiment of the present invention in the respective cases where N=1 and N=6. FIG. 6 and FIG. 7 are drawings illustrating exemplary transmission patterns of the synchronization signals transmitted at Step ST1 in the cases where N=1 and N=6. In the present invention, N may be values other than these.

Figure 7A:
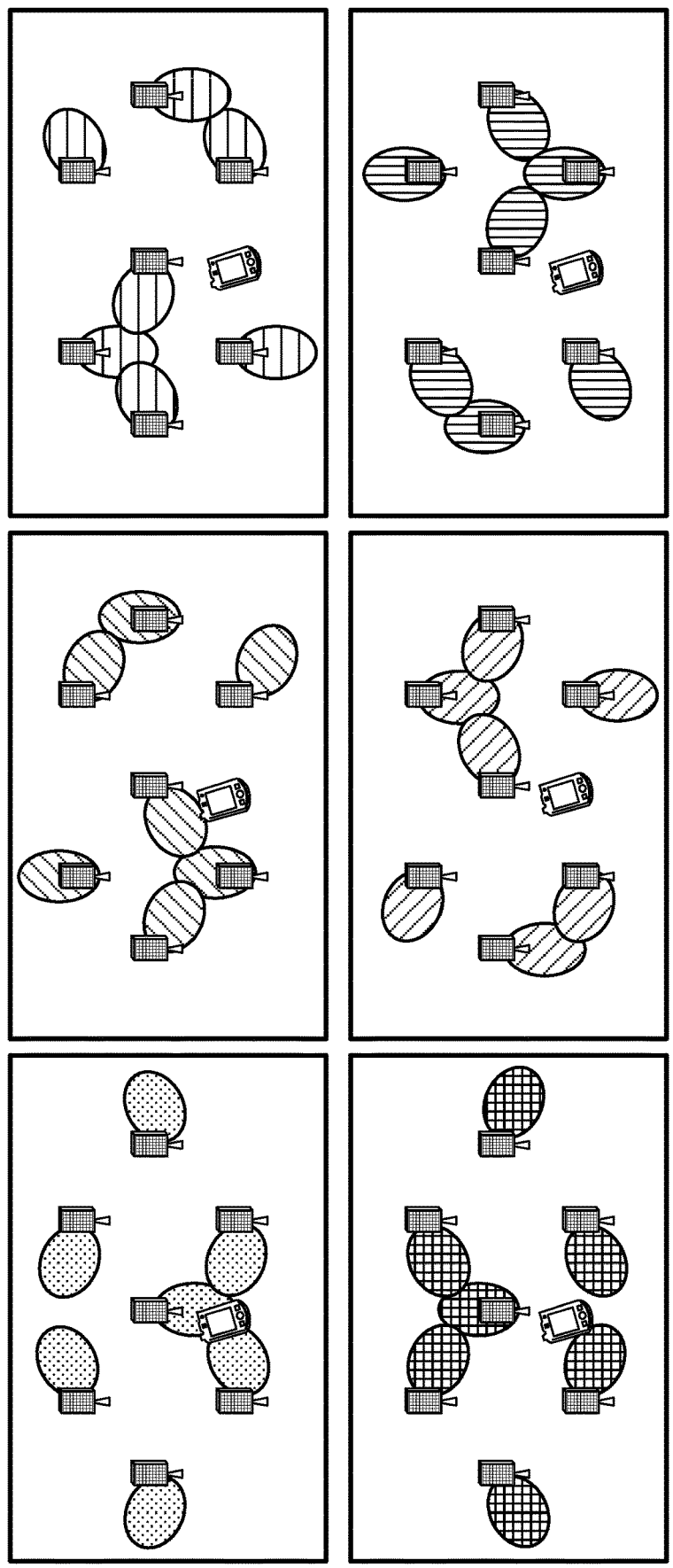
FIG. 7A and FIG. 7B are drawings illustrating exemplary transmission patterns of the synchronization signals transmitted at Step ST1 in the case where N=6.

In FIG. 4 and FIG. 5, one UE and three eNBs (an eNB 1 to an eNB 3) are illustrated. FIG. 6A and FIG. 7A illustrate drawings that overlook FIG. 4 and FIG. 5 over much wider ranges. In FIG. 4 to FIG. 7, between each of the eNBs may be coupled with wire and/or wirelessly to be constituted to exchange various kinds of information.

<Step ST1>

At Step ST1, the eNBs transmit the synchronization signal having the predetermined number (for example, N) of different patterns. For example, in the case where N>1, the eNB transmits the synchronization signal having a plurality of the different patterns using at least one of Time Division Multiplexing (TDM)/Frequency Division Multiplexing (FDM)/Code Division Multiplexing (CDM). In the case where N=1, the eNB can transmit the synchronization signal without applying these multiplex systems.

The eNB may transmit N pattern of synchronization signal based on a predetermined interval or a preliminarily determined rule. Unlike the synchronization signal (PSS/SSS) in the existing LTE, this synchronization signal can be constituted without applying scrambling by the cell ID. That is, it may be assumed that the UE cannot obtain the cell ID from this synchronization signal.

The pattern number of N of the synchronization signal is selectable in the operation according to, for example, a carrier frequency and a base station installation density. For example, N may be configured for the eNB when the station is installed by an operator or information regarding N may be notified from an external apparatus (for example, a higher station apparatus) during the operation. N may be configured to be decreased in the case where the carrier frequency is comparatively low and be increased in the case where the carrier frequency is comparatively large.

FIG. 4 and FIG. 6 illustrate a transmission pattern of the synchronization signal in the case where N=1. FIG. 6A illustrates exemplary areas to which the synchronization signals can reach at a timing when the synchronization signals are transmitted. FIG. 6B illustrates exemplary timings when the synchronization signals are transmitted. In the case where N=1, the transmission pattern is one pattern. Therefore, the synchronization signal is preferably not applied with Beam Forming as illustrated in FIG. 6A.

Figure 7B:
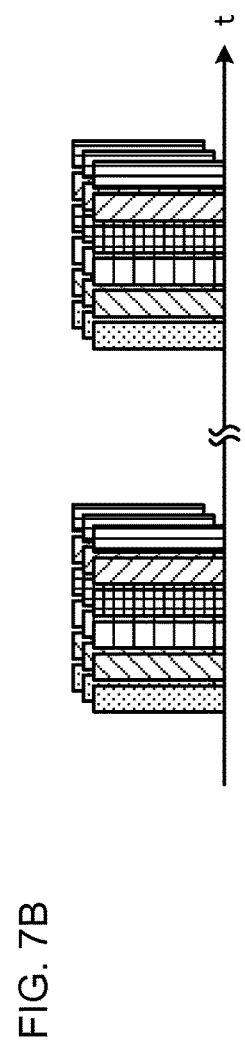

FIG. 5 and FIG. 7 illustrate transmission patterns of the synchronization signals in the case where N=6. FIG. 7A illustrates exemplary areas to which the synchronization signals can reach at a timing when the synchronization signals in respective patterns are transmitted. FIG. 7B illustrates exemplary timings when the synchronization signals in the respective patterns are transmitted.

Between the base stations, it is preferred to achieve and constitute a synchronous acquisition over a wide coverage by performing a synchronous transmission (for example, a transmission based on Single Frequency Network (SFN)). When the SFN transmission is performed, the TTI with which the synchronization signal is transmitted may use a longer CP length than the CP length used in another TTI.

In the case where the pattern number N is two or more, the synchronization signals corresponding to the respective patterns are preferred to be transmitted in mutually different beams. For example, FIG. 5 and FIG. 7 illustrate an example in which the synchronization signals in six patterns in the case where N=6 are transmitted by TDM using mutually different beams. In this example, each of the eNBs performs Beam Forming such that the beams of the synchronization signals cover almost all the directions (360°) in accordance with a time passage.

The beam applied to the synchronization signal is preferred to be a comparatively thick beam as illustrated in FIG. 5 and FIG. 7. While a shortage of the coverage is considered with the thick beam, the SFN transmission can compensate the coverage.

As illustrated in FIG. 7A, the synchronization signals of the plurality of eNBs in the predetermined pattern may be transmitted in different beam directions or may be transmitted in an identical beam direction. As illustrated in FIG. 7A, the thickness of the beam may be identical in each pattern or a different beam width may be used for each pattern.

A plurality of the beams being different represents a case in which, for example, at least one of the following (1) to (6), which are each applied to the plurality of beams, is different, but this should not be construed in a limiting sense: (1) the precoding, (2) a transmission power, (3) a phase rotation, (4) the beam width, (5) a beam angle (for example, a tilt angle), and (6) the number of layers. In the case where the precoding is different, a precoding weight may be different, and a precoding method (for example, a linear precoding and a non-linear precoding) may be different. In the case where the beam is applied with the linear/non-linear precoding, the transmission power, the phase rotation, the number of layers, and the like can change.

Examples of the linear precoding include precodings that obey Zero-Forcing (ZF) criterion, Regularized Zero-Forcing (R-ZF) criterion, and Minimum Mean Square Error (MMSE) criterion. Examples of the non-linear precodings include precodings, such as Dirty Paper Coding (DPC), Vector Perturbation (VP), and Tomlinson Harashima Precoding (THP). The applicable precodings are not limited to these.

The UE executes a synchronization process with the eNB based on the detected synchronization signal. Here, the synchronization process is at least one of, for example, a frequency synchronization and a time synchronization (for example, a phase synchronization and a symbol timing synchronization), but not limited to these.

In the case where N>1, the UE may obtain (recognize) a frame synchronization timing (frame boundary) from a constitution of the detected synchronization signal (for example, the number of patterns, the beams of respective patterns, the sequence, and the frequency resource position). The UE may obtain information (for example, a beam index (a beam number)) for specifying the beam used in the synchronization signal transmission from the detected synchronization signal. The information for specifying the beam may simply be referred to as beam specification information.

Furthermore, the UE may identify the pattern number N based on the detected synchronization signal. As one example, the synchronization signal may be constituted such that a sequence of an identical sequence index differs when N is different. For example, a given sequence (for example, a sequence #0) when N=1 and the identical given sequence #0 when N=6 may be different sequences. The UE may determine N by determining which sequence the sequence #0 belongs to.

The synchronization signal may be constituted so as not to include the identical sequence when N is different. For example, in the case where sequences #0 to #9 are available, the UE may determine N based on the detected sequence by using the sequence #0 when N=1, the sequences #1 to #3 when N=3, and the sequences #4 to #9 when N=6.

The synchronization signal may be constituted of a plurality of hierarchies (sets of synchronization signals). For the plurality of hierarchies, the synchronization signal constitutions of mutually different number of pattern may be specified or the synchronization signal constitutions of the identical number of pattern may be specified. For example, a first synchronization signal (a first synchronization signal set) having a pattern number of $N_1$ (for example, $N_1=1$) and a second synchronization signal (a second synchronization signal set) having a pattern number of $N_2$ (for example, $N_2=2$) may be specified.

In this case, the UE may receive at least one synchronization signal each from each of the synchronization signal set. For example, the UE may firstly detect the first synchronization signal, and then detect the second synchronization signal when this first synchronization signal has been detected.

With such configuration, a detection number of the synchronization signals by the UE can be reduced; therefore a load of the UE can be restrained. In the case where the synchronization signals in each of the hierarchies are transmitted at an identical timing, the eNB may transmit these in mutually different beams.

The UE may be constituted to roughly specify a beam direction from the first synchronization signal and to specify a further detailed beam direction from the second synchronization signal. The number of the synchronization signal (the number of hierarchy) is not limited to one or two, but may be the number of three or more. The synchronization signals in each of the hierarchies may be transmitted at an identical interval, and may be transmitted at different intervals.

Information regarding the constitution of the synchronization signal may be stored in the UE in advance, and may be constituted to be notified from the eNB. For example, when the UE can communicate with a second eNB (for example, communicate in LTE RAT) that is different from a first eNB (for example, communicate in 5G RAT), which transmits the synchronization signal according to Step ST1, the UE may receive and use information regarding the constitution of the synchronization signal transmitted by the first eNB from this second eNB for detecting this synchronization signal. The first eNB and the second eNB may be one base station.

The information regarding the constitution of the synchronization signal may be notified from the eNB to the UE in a physical layer signaling (for example, Downlink Control Information (DCI)), an upper layer signaling (for example, Radio Resource Control (RRC) signaling, notification information (a Master Information Block (MIB)), and a System Information Block (SIB)), other signals, or a combination of those.

<Step ST2>

At Step ST2, the UE determines the constitution of the RAP (for example, the radio resource and the sequence) based on the synchronization signal detected at Step ST1 and transmits the RAP to the eNB. For example, the UE selects a resource for transmitting the RAP (for example, the sequence (a preamble ID (RAPID)), and a time and/or frequency resource pattern) corresponding to the sequence pattern of the synchronization signal and/or the time/frequency/coding resource in which the synchronization signal has been detected.

For example, in the case where the plurality of patterns of the synchronization signals are Time Division Multiplexed/Frequency Division Multiplexed/Code Division Multiplexed, the UE may transmit the RAP using a RAP transmission resource uniquely obtained from the radio resource (the time/frequency/coding resource) in which the synchronization signal has been detected.

As illustrated in FIG. 4 and FIG. 5, the UE can transmit the RAP at a predetermined relative position with respect to a reception timing of the synchronization signal. The UE may determine a resource to be used randomly or based on a predetermined rule from a resource pool (a RAP transmission resource pool) that is a predetermined radio resource region (range) disposed in this relative position. Here, the predetermined rule may be a hopping pattern that switches the radio resource in the resource pool, and may use the radio resource at an identical relative position in the resource pool, for example.

The resource pool is preferred to be disposed for each pattern of the synchronization signal. FIG. 4 and FIG. 5 illustrate an example in which the pattern (a pattern index) of the synchronization signal and the RAP transmission resource pool region are associated. In FIG. 4, with respect to the pattern number N=1, one pool (a pool #1) corresponding to this pattern is disposed. In FIG. 5, with respect to the pattern number N=6, six pools (pools #1 to #6) corresponding to the respective patterns are disposed. The constitution of the resource pool (such as, the radio resource and an arrangement order) is not limited to the examples of FIG. 4 and FIG. 5.

In these drawings, the UE detects the synchronization signal in the pattern #1 (a SS pattern #1), therefore the UE controls to transmit the RAP with Pool #1 corresponding to this pattern. As illustrated in FIG. 4, the UE may determine a resource to use for the RAP transmission randomly or based on the predetermined rule in the resource pool.

Each of the resource pools may be arranged at each predetermined interval for retransmitting the RAP as illustrated. After transmitting the RAP, the UE attempts to receive the RAR corresponding to the transmitted RAP for a certain period. Then, in the case where the RAR cannot be received, the UE may perform retransmitting the RAP with an identical pool at the next interval, and may perform retransmitting the RAP with a different pool at the next interval. The resource pool is not limited to be periodically arranged, but the UE may be able to transmit the RAP using the resource pool at a predetermined timing.

The UE may specify a size of the resource pool (size of the radio resource of the resource pool) based on N in the case where the pattern number N is obtained from the sequence of the received synchronization signal. Here, it may be constituted that the smaller the value of N is, the more (larger) at least one of the sequence pattern, the resource pool size, and the number of resource pattern (for example, the resource hopping pattern) becomes.

The UE may determine the sequence to use for the RAP randomly or based on the predetermined rule from the sequence pattern in a predetermined range based on the synchronization signal.

In the case where the plurality of synchronization signals are detected during the predetermined period, the UE may transmit all the respective RAPs corresponding to this plurality of synchronization signals, and may transmit a part of the RAPs. For example, the UE may transmit the RAP of the synchronization signal corresponding to at least one of the following (a) to (c) (however, the condition is not limited to the following): (a) a received electric power (for example, a Reference Signal Received Power (RSRP)) is higher, (b) a reception quality (for example, a Reference Signal Received Quality (RSRQ) and a received signal to interference electric power ratio (a received Signal to Interference plus Noise Ratio (SINR)) are higher, and (c) the beam index is smaller.

The UE transmits the RAP without applying Beam Forming at Step ST2. The eNB attempts to receive the RAP by applying the reception BF in the resource for the RAP. The reception BF that the eNB applies may be different for each of the resource pools, and this ensures the eNB associating the RAPID and the beam direction (a direction of the UE).

The plurality of eNBs may detect the RAP transmitted from one UE. In FIG. 4 and FIG. 5, since the eNB 1 and the eNB 2 detect the RAP from the UE, Step ST3 and the subsequent steps are executed.

In the case where a plurality of the UEs detects the synchronization signal at Step ST1, these UEs may transmit identical RAPs, and may transmit different RAPs based on information specific to the UEs. The UE can change the sequence and the resource for transmitting the RAP based on the information specific to this UE.

The information regarding the predetermined relative position, the information regarding the resource pool, the information regarding the sequence pattern in the predetermined range, the information regarding the above-described condition under which the RAP is transmitted, the information specific to the UE, and the like at Step ST2 may be held in the UE in advance, and may be constituted to be notified by the eNB, similar to the above description regarding the information about the constitution of the synchronization signal at Step ST1.

<Step ST3>

At Step ST3, the eNB that detects the RAP at Step ST2 performs Beam Forming to transmit one or more signals including the RAR and the measurement reference signal. The RAR at Step ST3 can be the one that includes the information corresponding to the existing RAR (for example, a Temporary Cell-Radio Network Temporary Identity (TC-RNTI), and a UL grant).

Specifically, the eNB transmits the measurement reference signal (for example, the CSI-RS applied with the Beam Forming) together with the RAR toward the detected beam direction using the radio resource in the predetermined region. The measurement reference signal to be transmitted is preferred to be one or more measurement reference signal applied with different Beam Formings. This measurement reference signal does not perform the scrambling by the cell ID. The eNB can transmit the signal made of the RAR and the measurement reference signal at the predetermined relative position with respect to the timing of the detected resource for the RAP.

The beam applied to the measurement reference signal is preferred to be a comparatively thin beam (for example, the beam thinner than the synchronization signal) as illustrated in FIG. 5 and FIG. 7. The beam applied to the measurement reference signal is preferred to be transmitted only in a direction identical/similar to (covering) the direction to which the RAP is detected. This ensures reducing the overhead relative to the measurement reference signal.

The eNB transmits the RAR for notifying the detected RAPID with this measurement reference signal and the radio resource that performs the TDM and/or the FDM. The eNB may apply a Cyclic Redundancy Check (CRC) scrambling using a predetermined RNTI (for example, a RA-RNTI) or the RAPID detected by the eNB to the RAR (the downlink control channel scheduling the RAR).

In the case where a plurality of signals including the RAR and the measurement reference signal are transmitted to a predetermined UE, each of the signals may include the UL grant regarding an identical UL resource. The radio resource that the UL grant indicates is constituted to be different for each UE (preamble ID).

The eNB can collectively transmit the signals made of the RARs and the measurement reference signals to the plurality of UEs in the identical beam direction.

The UE receives one or more reference signals transmitted from the eNB and executes, for example, a measurement of a received signal electric power. The beam specification information (such as, the beam index) may be represented by the sequence of the measurement reference signal and/or the radio resource. The UE may specify the beam used in the transmission of the reference signal (and/or the RAR) based on the measurement reference signal. The beam specification information may be notified to the UE being included in the RAR or together with the RAR.

In the case where the plurality of eNBs detect the RAP transmitted from one UE at Step ST2, a plurality of the measurement reference signals and the RARs targeting an identical RAPID may be transmitted from a plurality of the base stations. Here, the UL grant included in the RAR may specify an identical radio resource with respect to the identical RAPID.

<Step ST4>

At Step ST4, the UE that received the RAR and the measurement reference signal at Step ST3 transmits the measurement report including the measurement result and the message 3. The message 3 at Step ST4 can be the one that includes information corresponding to the existing message 3 (for example, a connection request (RRC connection request) message including a UE identifier (UE identity) and the like). The message 3 may be constituted to include the Measurement Report.

Specifically, the UE may transmit the Measurement Report, which is obtained by measuring the measurement reference signal, together with the message 3 using the UL resource instructed by the UL grant included in the RAR. This Measurement Report may be constituted to include, for example, the beam specification information regarding the measurement reference signal and a single measurement result (for example, a One shot RSRP). The UE may transmit the beam specification information not included in the Measurement Report but together with the Measurement Report.

In order to achieve orthogonalization between the UEs that used the identical RAP, the Measurement Report and the message 3 may be transmitted by being multiplied by spreading sequence selected randomly or based on the predetermined rule. For example, the UE may apply the spreading sequence selected based on the information specific to the UE to these pieces of information and transmit these pieces of information.

The UE may transmit the measurement result of the plurality of measurement reference signals with the UL resource instructed by the UL grant. In the case where not all the measurement result of the plurality of measurement reference signals can be included in this UL resource, the UE may control to drop at least a part of the measurement result and transmit the remaining measurement result. For example, the UE may preferentially report the measurement result of the measurement reference signal with the best reception quality.

In the case where the Measurement Report and the message 3 are received from the predetermined UE, the eNB notifies this UE of the beam specification information of the beam that is a connection destination, a predetermined identifier (for example, the C-RNTI) used for scrambling this beam, and the message 4. In FIG. 4 and FIG. 5, the eNB 1 receives the Measurement Report and the message 3 from the UE using the reception BF. This predetermined identifier may be referred to as a beam identifier.

The message 4 can be the one that includes information (for example, a collision resolution message including a collision resolution identifier (contention resolution identity) and the like) corresponding to the existing message 4. The message 4 may be constituted to include the beam specification information and the above-described predetermined identifier.

The eNB may perform a CRC scrambling based on the UE identifier notified with the message 3 in a DL assignment (DL grant) for transmitting a notification of the message 4. For example, the eNB may execute the CRC scrambling using a value obtained by applying a modulo arithmetic to a value represented or obtained by the above-described UE identifier.

In the case where the plurality of eNBs detect the Measurement Report and the message 3 transmitted from one UE at Step ST4, this plurality of eNBs may transmit the message 4 (and the beam specification information and the scrambling identifier) to this UE. In this case, the UE may determine that the UE is in the RRC connection state with this plurality of eNBs, and may determine that the UE is in the RRC connection state with any one of the eNBs.

<Step ST5>

At Step ST5, the eNB executes a further beam adjustment through the CSI process. With the processes up to Step ST4, the UE is in the RRC connection state with the eNB. The eNB configures the CSI process to measure the channel state for the UE. The CSI process includes a resource for measuring a desired signal and a resource for measuring an interference signal. Here, the resource for measuring the desired signal may be the CSI-RS resource in LTE or have a resource constitution based on the CSI-RS, and may have another and new resource constitution. The resource for measuring the interference signal maybe a CSI Interference Measurement (CSI-IM) resource in LTE or have a resource constitution based on the CSI-IM, and may have another and new resource constitution.

Here, the UE may be configured to measure the resource for measuring the desired signal and/or the resource for measuring the interference signal transmitted from the plurality of eNBs.

The UE transmits a CSI feedback based on the CSI process to at least one of the eNBs in connection. The eNB adjusts (for example, adjusts the precoding) the beam used in the transmission of various signals (such as the control signal and the data signal) for this UE based on the CSI feedback (see FIG. 4). The eNB may instruct another eNB to transmit the various signals for this UE using the beam from another eNB, and may control the various signals for this UE in cooperation with another eNB (see FIG. 5).

<Modification>

In the carrier (for example, 5G RAT) in which the above-described synchronization signal is transmitted, the eNB and/or the UE may be the ones not supporting a broadcast channel that corresponds to a Physical Broadcast Channel (PBCH) of the existing LTE. This is because the existing PBCH does not apply the Beam Forming. In this case, the notification information (such as system information) can be transmitted like the SIB (also referred to as a Dynamic Broadcast Channel (DBCH)) using a downlink shared channel (for example, a Physical Downlink Shared Channel (PDSCH)).

In the carrier (for example, 5G RAT) in which the above-described synchronization signal is transmitted, the eNB may transmit the PBCH (notification information) having a predetermined number (for example, M) of different patterns using at least one of TDM/FDM/CDM, similar to the description given for the synchronization signal. The PBCH corresponding to each of the patterns is preferred to be transmitted in a mutually different beam. The pattern number M regarding the PBCH may be different from or identical to the pattern number N regarding the synchronization signal.

The constitutions indicated in the respective embodiments of the present invention are applicable regardless of the radio access system. For example, even when the radio access system used in the downlink (uplink) is the OFDMA, the SC-FDMA, or another radio access system, the present invention can be applied. That is, the symbols indicated in each of the working examples are not limited to the OFDM symbols and the SC-FDMA symbols.

The above-described radio communication method may be applied not only to 5G RAT but also to another RAT including LTE. The above-described radio communication method may be applicable to all of a Primary Cell (PCell) and a Secondary Cell (SCell), and may be applicable only to any one of the cells. For example, the above-described radio communication method may be applied only in the licensed band (or a carrier in which a listening is not configured), and the above-described radio communication method may be applied only in the unlicensed band (or a carrier in which the listening is not configured).

At least a part of Step ST1 to Step ST5 indicated in the above-described embodiment may be performed. For example, Step ST1 to Step ST4 can be performed.

(Radio Communication System)

The following describes a constitution of a radio communication system according to the embodiment of the present invention. The above-described radio communication methods according to any one of and/or combinations of the embodiments of the present invention are applied to this radio communication system.

Figure 8:
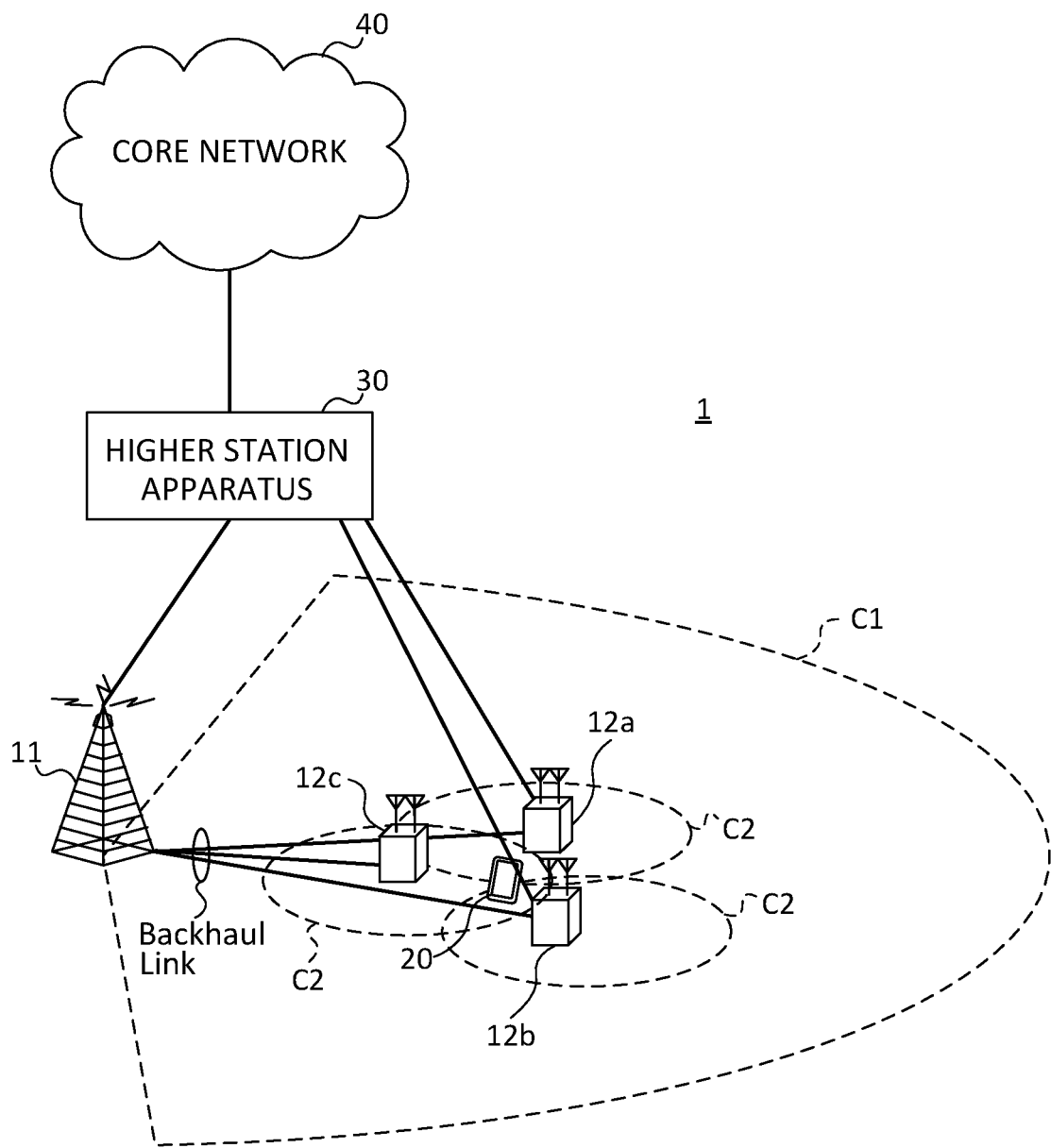
FIG. 8 is a drawing illustrating an exemplary schematic configuration of a radio communication system according to the embodiment of the present invention.

FIG. 8 is a drawing illustrating an exemplary schematic constitution of the radio communication system according to the embodiment of the present invention. A radio communication system 1 can apply Carrier Aggregation (CA) and/or Dual Connectivity (DC) that integrate a plurality of basic frequency blocks (Component Carriers) with a system bandwidth (for example, 20 MHz) of a LTE system as one unit.

The radio communication system 1 may also be referred to as, for example, Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), and New Radio Access Technology (RAT), and may also be referred to as systems that achieve these.

The radio communication system 1 illustrated in FIG. 8 includes a radio base station 11 that forms a macrocell C1 having a comparatively wide coverage, and radio base stations 12 (12a to 12c) disposed within the macrocell C1 to form small cells C2 narrower than the macrocell C1. A user terminal 20 is disposed in the macrocell C1 and the respective small cells C2.

The user terminal 20 can be coupled to both of the radio base station 11 and the radio base station 12. It is assumed that the user terminal 20 simultaneously uses the macrocell C1 and the small cell C2 by the CA or the DC. The user terminal 20 may apply the CA or the DC using a plurality of cells (CCs) (for example, five or less CCs, six or more CCs).

Between the user terminal 20 and the radio base station 11, communication is possible using a carrier (referred to as, for example, an existing carrier and a Legacy carrier) whose bandwidth is narrow in a relatively low frequency bandwidth (for example, 2 GHz). On the other hand, between the user terminal 20 and the radio base station 12, a carrier (for example, a 5G RAT carrier) whose bandwidth is wide in a relatively high frequency bandwidth (for example, 3.5 GHz and 5 GHz) may be used, and a carrier identical to that with the radio base station 11 may be used. The constitution of the frequency bandwidths used by the respective radio base stations is not limited to this.

Between the radio base station 11 and the radio base station 12 (alternatively, between the two radio base stations 12), wired connection (for example, optical fiber and X2 interface compliant to Common Public Radio Interface (CPRI)) or wireless (radio) connection can be constituted.

The radio base station 11 and the respective radio base stations 12 are each coupled to a higher station apparatus 30, and coupled to a core network 40 via the higher station apparatus 30. The higher station apparatus 30 includes, for example, an access gateway apparatus, a radio network controller (RNC), and a mobility management entity (MME). However, the higher station apparatus 30 is not limited to this. The respective radio base stations 12 may be coupled to the higher station apparatus 30 via the radio base station 11.

The radio base station 11, which is a radio base station having relatively wide coverage, may be referred to as, for example, a macro base station, an aggregation node, an eNodeB (eNB), and a transmission/reception point. The radio base station 12, which is a radio base station having local coverage, may be referred to as, for example, a small base station, a micro base station, a pico base station, a femto base station, a Home eNodeB (HeNB), a Remote Radio Head (RRH), and a transmission/reception point. Hereinafter, when the radio base stations 11 and 12 are not discriminated, they are collectively referred to as a radio base station 10.

Each user terminal 20, which is a terminal corresponding to various communication systems such as LTE and LTE-A, may include not only a mobile communication terminal but also a fixed communication terminal.

In the radio communication system 1, as a radio access system, the Orthogonal Frequency Division Multiple Access (OFDMA) is applied to the downlink, and the Single-Carrier Frequency Division Multiple Access (SC-FDMA) is applied to the uplink. The OFDMA is a multiple carrier transmission system that divides the frequency band into a plurality of narrow frequency bands (subcarriers) to communicate such that data is mapped to the respective subcarriers. The SC-FDMA is a single carrier transmission system that divides the system bandwidth into bands constituted of one or consecutive resource blocks for each terminal and uses a plurality of terminals with bands different from one another to reduce interference between the terminals. The uplink and downlink radio access system is not limited to these combinations.

In the radio communication system 1, as a downlink channel, for example, the Physical Downlink Shared Channel (PDSCH), the Physical Broadcast Channel (PBCH), and a downlink L1/L2 control channel, which are shared by the respective user terminals 20, are used. The PDSCH transmits, for example, user data, upper layer control information, and the System Information Block (SIB). The PBCH transmits the Master Information Block (MIB).

The downlink L1/L2 control channel includes, for example, the Physical Downlink Control Channel (PDCCH), an Enhanced Physical Downlink Control Channel (EPDCCH)), a Physical Control Format Indicator Channel (PCFICH), and a Physical Hybrid-ARQ Indicator Channel (PHICH). The PDCCH transmits, for example, the Downlink Control Information (DCI) including scheduling information of the PDSCH and the PUSCH. The PCFICH transmits the number of the OFDM symbols used for the PDCCH. The PHICH transmits the delivery confirmation information (for example, referred to as retransmission control information, HARQ-ACK, and ACK/NACK) of a Hybrid Automatic Repeat reQuest (HARD) with respect to the PUSCH. The EPDCCH is frequency-division-multiplexed with the downlink shared data channel (PDSCH) to be used for transmission of the DCI and the like, similar to the PDCCH.

In the radio communication system 1, as an uplink channel, for example, the Physical Uplink Shared Channel (PUSCH), the Physical Uplink Control Channel (PUCCH), and a Physical Random Access Channel (PRACH), which are shared by the respective user terminals 20, are used. The PUSCH transmits the user data and the upper layer control information. The PUCCH transmits Uplink Control Information (UCI) including at least one of, for example, downlink radio quality information (Channel Quality Indicator (CQI)) and the delivery confirmation information. The PRACH transmits the random access preamble for connection establishment with the cell.

The radio communication system 1 transmits, for example, the Cell-specific Reference Signal (CRS), the Channel State Information-Reference Signal (CSI-RS), a DeModulation Reference Signal (DMRS), and a position determination reference signal (Positioning Reference Signal (PRS)) as the downlink reference signals. The radio communication system 1 transmits, for example, a measurement reference signal (Sounding Reference Signal (SRS)) and the DeModulation Reference Signal (DMRS) as the uplink reference signals. The DMRS may also be referred to as a UE-specific Reference Signal. The transmitted reference signals are not limited to these signals.

(Radio Base Station)

Figure 9:
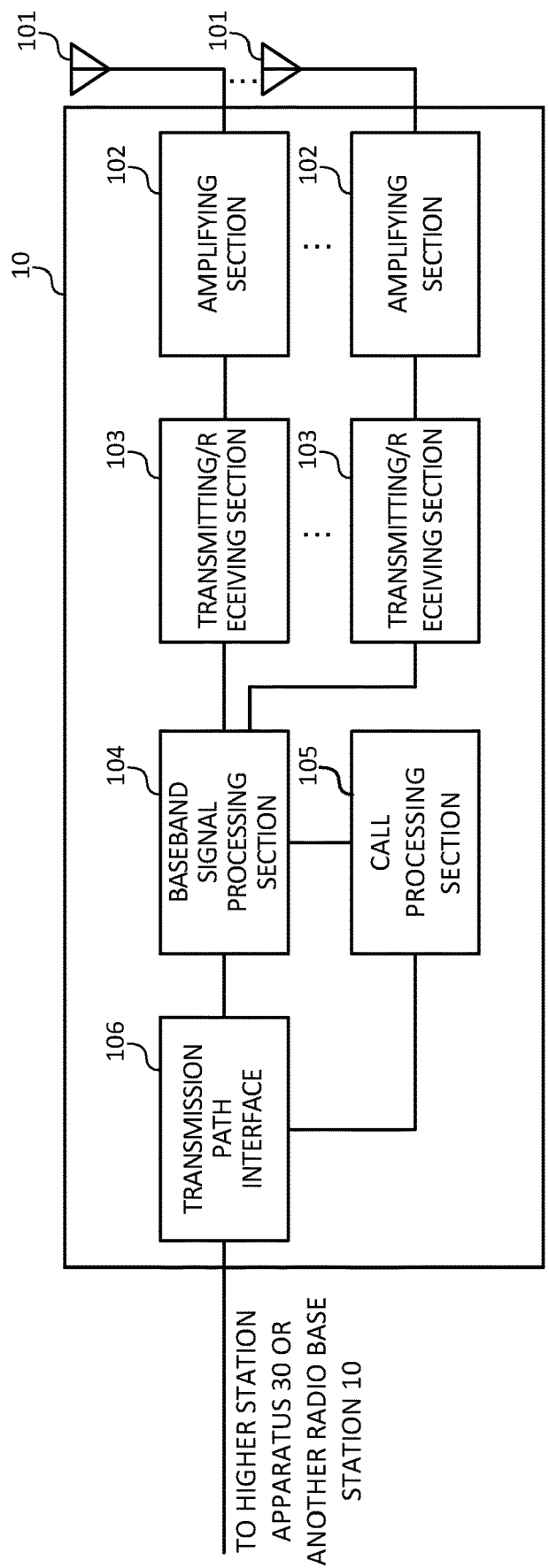
FIG. 9 is a drawing illustrating an exemplary overall configuration of a radio base station according to the embodiment of the present invention.

FIG. 9 is a drawing illustrating an exemplary overall constitution of the radio base station according to the embodiment of the present invention. The radio base station 10 includes a plurality of transmitting/receiving antennas 101, amplifying sections 102, transmitting/receiving sections 103, a baseband signal processing section 104, a call processing section 105, and a transmission path interface 106. It is only necessary to include one or more of respective transmitting/receiving antennas 101, amplifying sections 102, and transmitting/receiving sections 103.

The user data transmitted from the radio base station 10 to the user terminal 20 by the downlink is input to the baseband signal processing section 104 from the higher station apparatus 30 via the transmission path interface 106.

The baseband signal processing section 104 performs transmitting processes such as a process of a Packet Data Convergence Protocol (PDCP) layer, dividing and coupling of the user data, a transmitting process of the RLC layer such as Radio Link Control (RLC) retransmission control, Medium Access Control (MAC) retransmission control (for example, a HARQ transmitting process), scheduling, transmitting format selection, channel coding, an Inverse Fast Fourier Transform (IFFT) process, and a precoding process on the user data to forward the user data to the transmitting/receiving section 103. The baseband signal processing section 104 also performs the transmitting processes, such as the channel coding and the Inverse Fast Fourier Transform on the downlink control signal to forward the downlink control signal to the transmitting/receiving section 103.

The transmitting/receiving section 103 converts a baseband signal precoded to be output for each antenna from the baseband signal processing section 104, into a radio frequency band to transmit. A radio frequency signal frequency-converted at the transmitting/receiving section 103 is amplified by the amplifying section 102 to be transmitted from the transmitting/receiving antenna 101. The transmitting/receiving section 103 can be constituted of a transmitter/receiver, a transmitting/receiving circuit, or a transmitting/receiving apparatus described based on a common view in the technical field according to the present invention. The transmitting/receiving section 103 may be constituted as an integrated transmitting/receiving section, and may be constituted of the transmitting section and the receiving section. The transmitting/receiving section 103 transmits, for example, the synchronization signal and the broadcast signal to the user terminal 20.

On the other hand, for the uplink signal, the radio frequency signal received at the transmitting/receiving antenna 101 is amplified at the amplifying section 102. The transmitting/receiving section 103 receives the uplink signal amplified at the amplifying section 102. The transmitting/receiving section 103 frequency-converts a reception signal into a baseband signal to output to the baseband signal processing section 104.

The baseband signal processing section 104, with respect to the user data included in the input uplink signal, performs the Fast Fourier Transform (FFT) process, an Inverse Discrete Fourier Transform (IDFT) process, error correction decoding, the receiving process of the MAC retransmission control, and the receiving process of the RLC layer and the PDCP layer to forward to the higher station apparatus 30 via the transmission path interface 106. The call processing section 105 performs call processes of, for example, configuration and release of a communication channel, state management of the radio base station 10, and management of the radio resource.

The transmission path interface 106 transmits/receives the signal to/from the higher station apparatus 30 via a predetermined interface. The transmission path interface 106 may transmit/receive (backhaul signaling) the signal to/from another radio base station 10 via the interface between the base stations (for example, the optical fiber and the X2 interface compliant to the Common Public Radio Interface (CPRI)).

The transmitting/receiving section 103 transmits the synchronization signal to the user terminal 20. The transmitting/receiving section 103 can transmit the synchronization signal having a predetermined number of different patterns (constitution) by multiplexing by at least one of TDM, FDM and CDM. The transmitting/receiving section 103 can transmit these synchronization signals having the predetermined number of different patterns in mutually different beams. The transmitting/receiving section 103 may transmit the RAR and the measurement reference signal.

The transmitting/receiving section 103 may transmit, for example, the information regarding the constitution of the synchronization signal, the information regarding the predetermined relative position between the synchronization signal and the resource pool for the RAP, the information regarding the resource pool for the RAP, the information regarding the sequence pattern for the RAP, the information regarding the condition under which the RAP is transmitted, the information to the UE, and the information regarding the CSI process.

The transmitting/receiving section 103 may receive, for example, the RAP based on the synchronization signal, the message 3, and the Measurement Report from the user terminal 20.

Figure 10:
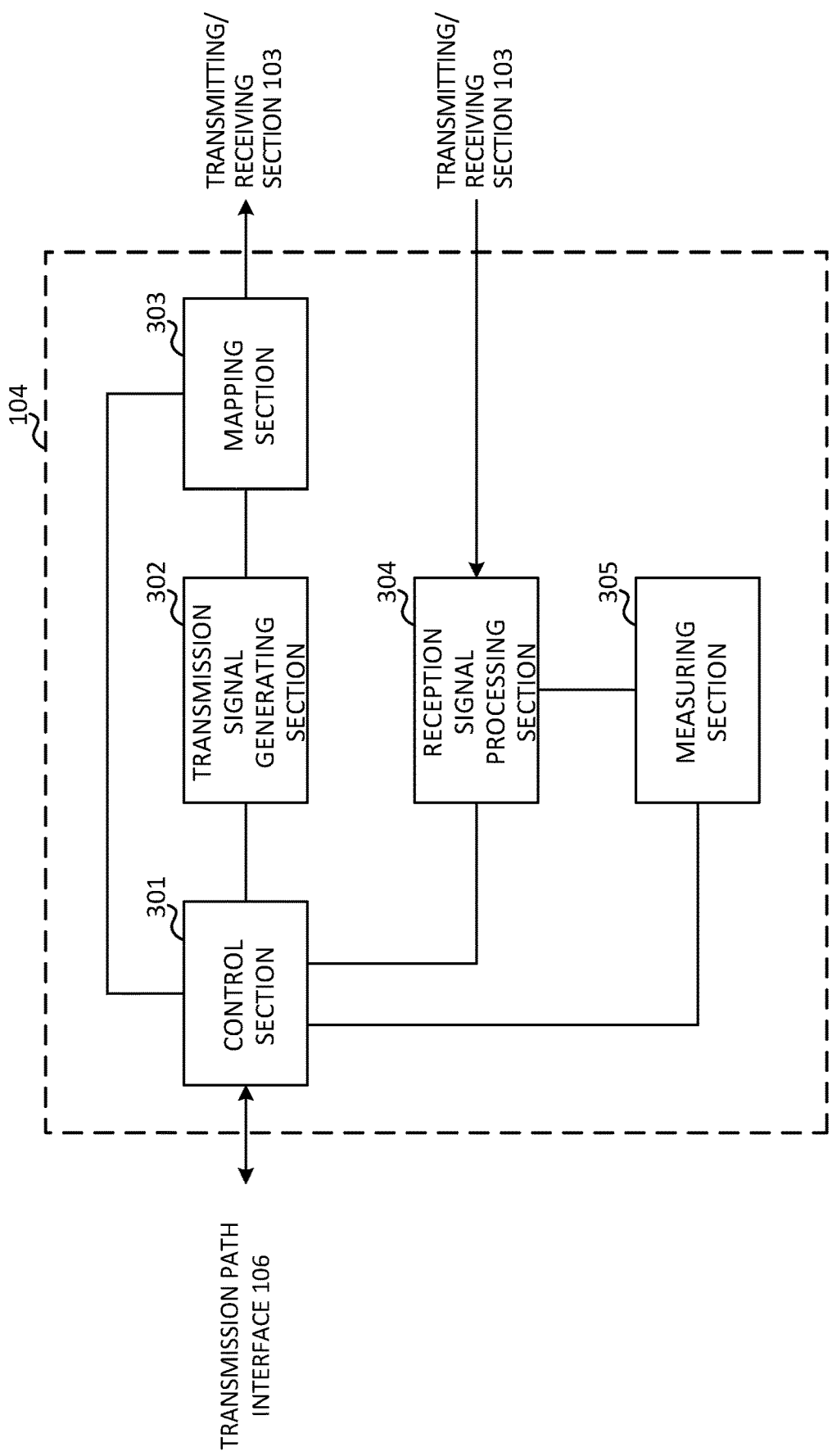
FIG. 10 is a drawing illustrating an exemplary function configuration of the radio base station according to the embodiment of the present invention.

FIG. 10 is a drawing illustrating an exemplary function constitution of the radio base station according to the embodiment of the present invention. FIG. 10 mainly illustrates function blocks at a characterizing part according to the embodiment, and it is assumed that the radio base station 10 also has other function blocks required for the radio communication. As illustrated in FIG. 10, the baseband signal processing section 104 includes at least a control section (scheduler) 301, a transmission signal generating section 302, a mapping section 303, a reception signal processing section 304, and a measurement section 305.

The control section (scheduler) 301 executes a control of the entire radio base station 10. The control section 301 can be constituted of a controller, a control circuit, or a control apparatus described based on the common view in the technical field according to the present invention.

The control section 301 controls, for example, generation of signals by the transmission signal generating section 302 and allocation of the signals by the mapping section 303. The control section 301 controls a receiving process of the signal by the reception signal processing section 304 and the measurement of the signals by the measurement section 305.

The control section 301 controls scheduling (for example, resource allocation) of system information, the downlink data signal transmitted at the PDSCH, a downlink control signal transmitted at the PDCCH and/or the EPDCCH. The control section 301 controls scheduling of the downlink reference signal, such as the synchronization signal (the Primary Synchronization Signal (PSS)/the Secondary Synchronization Signal (SSS)), the CRS, the CSI-RS, and the DMRS.

The control section 301 controls scheduling of the uplink data signal transmitted at the PUSCH, the uplink control signal (for example, the delivery confirmation information) transmitted at the PUCCH and/or PUSCH, the random access preamble transmitted at the PRACH, and the uplink reference signal.

Specifically, the control section 301 controls this radio base station 10 to communicate using a predetermined radio access system (for example, LTE RAT and 5G RAT). The control section 301 controls to transmit/receive the signals in accordance with the numerology applied to the radio access system used in the communication.

The control section 301 controls to generate and transmit the synchronization signal having the predetermined number of different patterns. The control section 301 may control not to scramble the synchronization signal by the cell ID. The control section 301 may constitute one synchronization signal set with the synchronization signal having the predetermined number of different pattern to perform, for example, a beam control for each of the synchronization signal set.

The control section 301 can obtain the relationship between the synchronization signal and the RAP constitution and controls to receive the RAP using the sequence and/or the radio resource that is determined based on the synchronization signal in the user terminal 20.

The control section 301 controls to transmit the signal including the RAR corresponding to the received RAP and the measurement reference signal in the direction from which the RAP is transmitted using the predetermined beam. The control section 301 performs the reception BF using this predetermined beam and controls to receive the beam specification information regarding the above-described measurement reference signal and the Measurement Report including the measurement result of this measurement reference signal.

The control section 301 may perform a further beam adjustment to the user terminal 20 in the RRC connection state through the CSI process.

The transmission signal generating section 302 generates the downlink signals (such as the downlink control signal, the downlink data signal, and the downlink reference signal) to output to the mapping section 303, based on an instruction from the control section 301. The transmission signal generating section 302 can be constituted of a signal generator, a signal generation circuit, or a signal generation apparatus described based on the common view in the technical field according to the present invention.

The transmission signal generating section 302 generates the DL assignment that notifies the allocation information of the downlink signal and the UL grant that notifies the allocation information of the uplink signal based on, for example, the instruction from the control section 301. To the downlink data signal, a coding process and a modulation process is performed in accordance with, for example, the code rate and the modulation scheme determined based on, for example, the channel state information (CSI) from the respective user terminals 20.

The mapping section 303 maps the downlink signal generated at the transmission signal generating section 302 to a predetermined radio resource to output the downlink signal to the transmitting/receiving section 103, based on the instruction from the control section 301. The mapping section 303 can be constituted of a mapper, a mapping circuit, or a mapping apparatus described based on the common view in the technical field according to the present invention.

The reception signal processing section 304 performs the receiving process (for example, demapping, demodulating, and decoding) with respect to the received signal input from the transmitting/receiving section 103. Here, the received signal is, for example, the uplink signal (such as the uplink control signal, the uplink data signal, and the uplink reference signal) transmitted from the user terminal 20. The reception signal processing section 304 can be constituted of a signal processor, a signal processing circuit, or a signal processing apparatus described based on the common view in the technical field according to the present invention.

The reception signal processing section 304 outputs the information decoded by the receiving process to the control section 301. For example, when the reception signal processing section 304 receives the PUCCH including the HARQ-ACK, the reception signal processing section 304 outputs the HARQ-ACK to the control section 301. The reception signal processing section 304 outputs the received signal and the signal after the receiving process to the measurement section 305.

The measurement section 305 executes the measurement regarding the received signal. The measurement section 305 can be constituted of a measuring instrument, a measuring circuit, or a measuring apparatus described based on the common view in the technical field according to the present invention.

The measurement section 305 may measure, for example, the received electric power of the received signal (for example, the Reference Signal Received Power (RSRP)), a received signal strength (for example, a Received Signal Strength Indicator (RSSI)), a reception quality (for example, the Reference Signal Received Quality (RSRQ)), and the channel state. The measurement result may be output to the control section 301.

(User Terminal)

Figure 11:
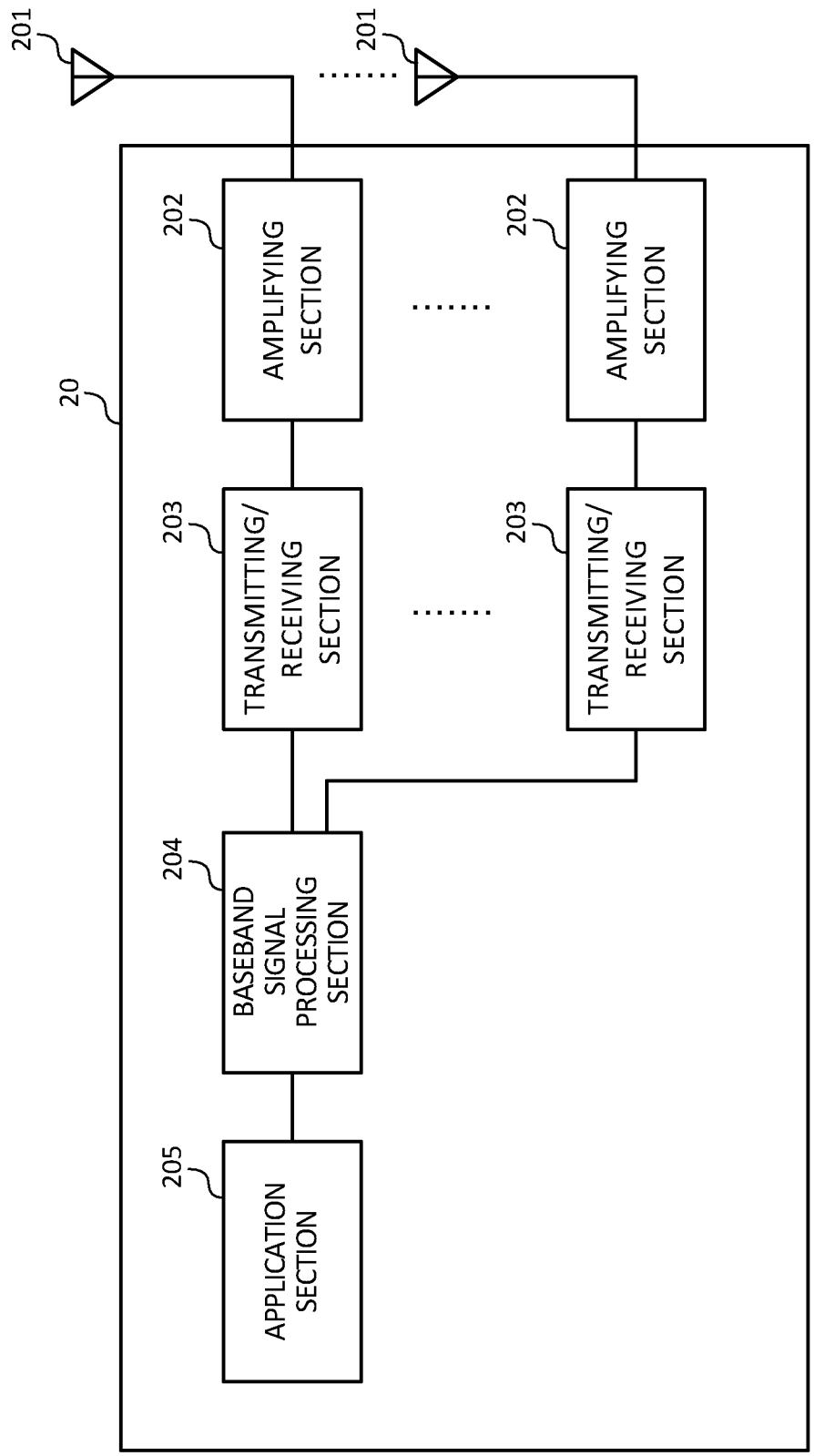
FIG. 11 is a drawing illustrating an exemplary overall configuration of a user terminal according to the embodiment of the present invention.

FIG. 11 is a drawing illustrating an exemplary overall constitution of the user terminal according to the embodiment of the present invention. The user terminal 20 includes a plurality of transmitting/receiving antennas 201, amplifying sections 202, and transmitting/receiving sections 203, a baseband signal processing section 204, and an application section 205. It is only necessary to include one or more of respective transmitting/receiving antennas 201, amplifying sections 202, and transmitting/receiving sections 203.

The radio frequency signals received at the transmitting/receiving antenna 201 is amplified at the amplifying section 202. The transmitting/receiving section 203 receives the downlink signal (for example, the synchronization signal and the broadcast signal) amplified at the amplifying section 202. The transmitting/receiving section 203 frequency-converts the reception signal into the baseband signal to output the baseband signal to the baseband signal processing section 204. The transmitting/receiving section 203 can be constituted of the transmitter/receiver, the transmitting/receiving circuit or the transmitting/receiving apparatus described based on the common view in the technical field according to the present invention. The transmitting/receiving section 203 may be constituted as an integrated transmitting/receiving section, and may be constituted of the transmitting section and the receiving section.

The baseband signal processing section 204 performs, for example, the FFT process, the error correction decoding, and the receiving process of the retransmission control, with respect to the input baseband signal. The user data in the downlink is forwarded to the application section 205. The application section 205 performs, for example, a process regarding a layer upper than a physical layer and a MAC layer. Among the data in the downlink, the notification information is also forwarded to the application section 205.

On the other hand, the user data in the uplink is input to the baseband signal processing section 204 from the application section 205. The baseband signal processing section 204 performs, for example, the transmitting process of the retransmission control (for example, the transmitting process of the HARQ), the channel coding, the precoding, a Discrete Fourier Transform (DFT) process, and an IFFT process to forward to the transmitting/receiving section 203. The transmitting/receiving section 203 converts the baseband signal output from the baseband signal processing section 204 into the radio frequency band to transmit. The radio frequency signal frequency-converted at the transmitting/receiving section 203 is amplified at the amplifying section 202 to be transmitted from the transmitting/receiving antenna 201.

The transmitting/receiving section 203 receives the synchronization signal from the radio base station 10. This synchronization signal may be at least one of the synchronization signals having a predetermined number of different patterns (constitution), which are multiplexed by at least one of TDM, FDM and CDM. These synchronization signals having the predetermined number of different patterns are preferred to be transmitted in mutually different beams.

In the case where a plurality of the synchronization signal set is configured (specified) for the UE, the transmitting/receiving section 203 may receive at least one each of the synchronization signals from each of the synchronization signal set. The transmitting/receiving section 203 may receive the RAR and the measurement reference signal.

The transmitting/receiving section 203 may receive, for example, the information regarding the constitution of the synchronization signal, the information regarding the predetermined relative position between the synchronization signal and the resource pool for the RAP, the information regarding the resource pool for the RAP, the information regarding the sequence pattern for the RAP, the information regarding the condition under which the RAP is transmitted, the information specific to the UE, and the information regarding the CSI process.

The transmitting/receiving section 203 may transmit, for example, the RAP based on the synchronization signal, the message 3, the Measurement Report to the radio base station 10.

Figure 12:
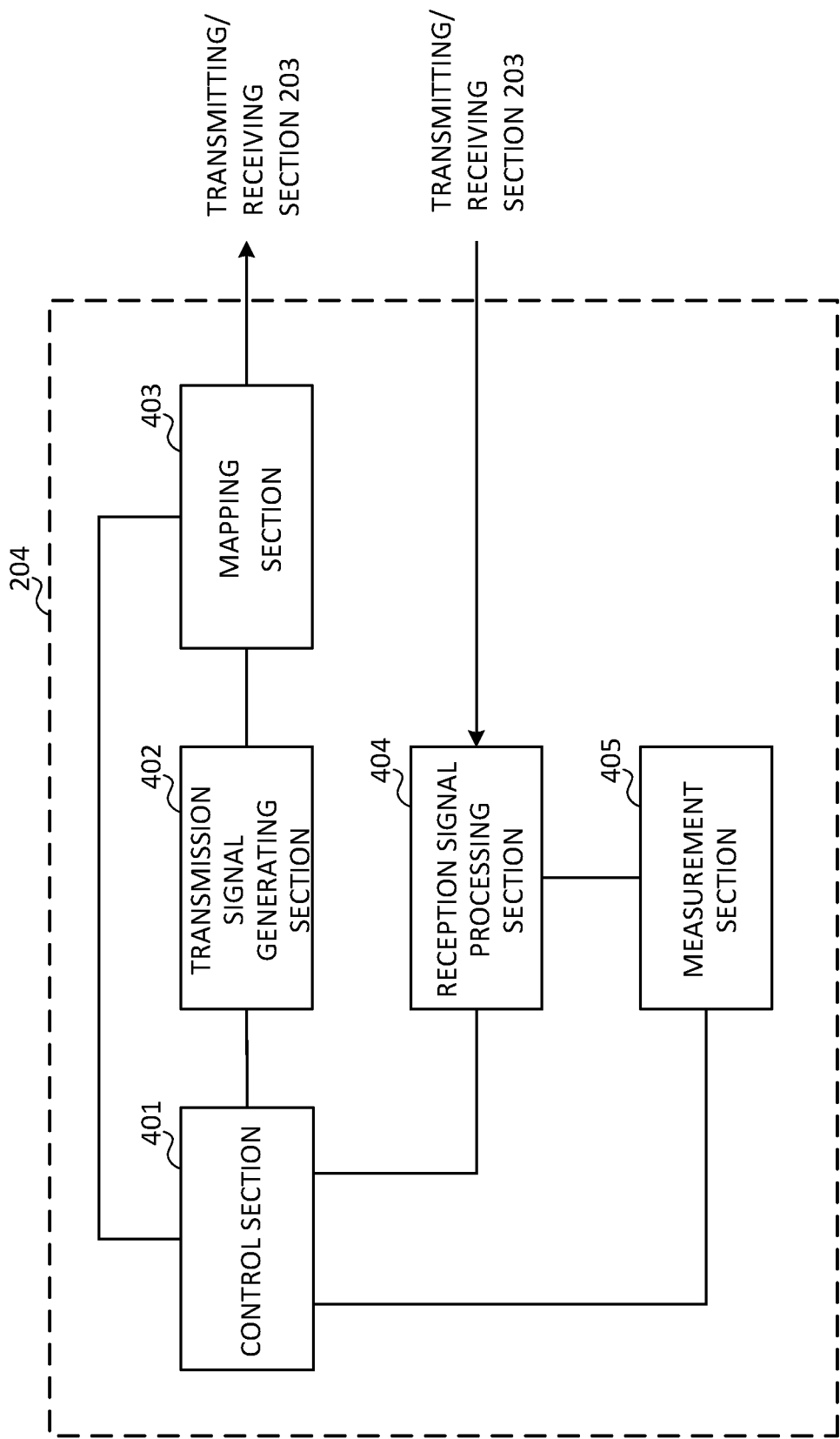
FIG. 12 is a drawing illustrating an exemplary function configuration of the user terminal according to the embodiment of the present invention.

FIG. 12 is a drawing illustrating an exemplary function constitution of the user terminal according to the embodiment of the present invention. FIG. 12 mainly illustrates function blocks at a characterizing part according to the embodiment, and it is assumed that the user terminal 20 also has other function blocks required for the radio communication. As illustrated in FIG. 12, the baseband signal processing section 204 included in the user terminal 20 includes at least a control section 401, a transmission signal generating section 402, a mapping section 403, a reception signal processing section 404, and a measurement section 405.

The control section 401 controls the entire user terminal 20. The control section 401 can be constituted of a controller, a control circuit, or a control apparatus described based on the common view in the technical field according to the present invention.

The control section 401, for example, controls the generation of the signal by the transmission signal generating section 402 and the allocation of the signals by the mapping section 403. The control section 401 controls the receiving process of the signal by the reception signal processing section 404 and the measurement of the signal by the measurement section 405.

The control section 401 obtains the downlink control signal (the signal transmitted in the PDCCH/EPDCCH) and the downlink data signal (the signal transmitted in the PDSCH) transmitted from the radio base station 10, from the reception signal processing section 404. The control section 401 controls generation of the uplink control signal (for example, the delivery confirmation information) and the uplink data signal based on, for example, a result that necessity of the retransmission control with respect to the downlink control signal and the downlink data signal has been determined.

Specifically, the control section 401 controls this user terminal 20 to communicate using a predetermined radio access system (for example, LTE RAT and 5G RAT). The control section 401 specifies the numerology applied to the radio access system used in the communication to control transmitting/receiving the signal in accordance with this numerology.

The control section 401 determines the constitution (for example, the sequence and/or the radio resource) of the RAP based on the synchronization signal received by the transmitting/receiving section 203. Then, the control section 401 controls so as to transmit the RAP to the radio base station 10 using the determined constitution of the RAP. For example, the control section 401 may select the radio resource included in a predetermined region (the resource pool for the RAP) disposed in the predetermined relative position with respect to the reception timing of the synchronization signal to control to transmit the RAP using the selected radio resource.

The control section 401 controls to receive the signal including the RAR corresponding to the transmitted RAP and the measurement reference signal from the radio base station 10.

The control section 401 controls to transmit the beam specification information regarding the above-described measurement reference signal and the Measurement Report including the measurement result of this measurement reference signal to the radio base station 10.

The transmission signal generating section 402 generates the uplink signal (for example, the uplink control signal, the uplink data signal, and the uplink reference signal) based on the instruction from the control section 401 and outputs the uplink signal to the mapping section 403. The transmission signal generating section 402 can be constituted of a signal generator, a signal generation circuit, or a signal generation apparatus described based on the common view in the technical field according to the present invention.

The transmission signal generating section 402, for example, generates the uplink control signal regarding the delivery confirmation information and channel state information (CSI) based on the instruction from the control section 401. The transmission signal generating section 402 generates the uplink data signal based on the instruction from the control section 401. For example, when the downlink control signal notified from the radio base station 10 includes the UL grant, the control section 401 instructs the transmission signal generating section 402 to generate the uplink data signal.

The mapping section 403 maps the uplink signal generated at the transmission signal generating section 402 to the radio resource to output to the transmitting/receiving section 203, based on the instruction from the control section 401. The mapping section 403 can be constituted of a mapper, a mapping circuit, or a mapping apparatus described based on the common view in the technical field according to the present invention.

The reception signal processing section 404 performs the receiving process (for example, demapping, demodulating, and decoding) with respect to the received signal input from the transmitting/receiving section 203. Here, the received signal is, for example, the downlink signal (such as the downlink control signal, the downlink data signal, and the downlink reference signal) transmitted from the radio base station 10. The reception signal processing section 404 can be constituted of a signal processor, a signal processing circuit, or a signal processing apparatus described based on the common view in the technical field according to the present invention. The reception signal processing section 404 can constitute the receiving section according to the present invention.

The reception signal processing section 404 outputs the information decoded by the receiving process to the control section 401. The reception signal processing section 404 outputs, for example, the notification information, the system information, the RRC signaling, and the DCI to the control section 401. The reception signal processing section 404 outputs the received signal and the signal after the receiving process to the measurement section 405.

The measurement section 405 executes the measurement regarding the received signal. The measurement section 405 can be constituted of a measuring instrument, a measuring circuit, or a measuring apparatus described based on the common view in the technical field according to the present invention.

The measurement section 405 may measure, for example, the received electric power (for example, the RSRP) of the received signal, the received signal strength (for example, the RSSI), the reception quality (for example, the RSRQ) and the channel state. The measurement result may be output to the control section 401.

(Hardware Constitution)

The block diagrams used for the above-described description of the embodiment illustrate blocks by functions. These function blocks (constitution sections) are implemented with an optional combination of hardware and/or software. An implementation means of each function block is not specifically limited. That is, each function block may be implemented with physically-bounded one apparatus, and coupling physically-separate two or more apparatuses with wire or without wire, each function block may be implemented with these plurality of apparatuses.

Figure 13:
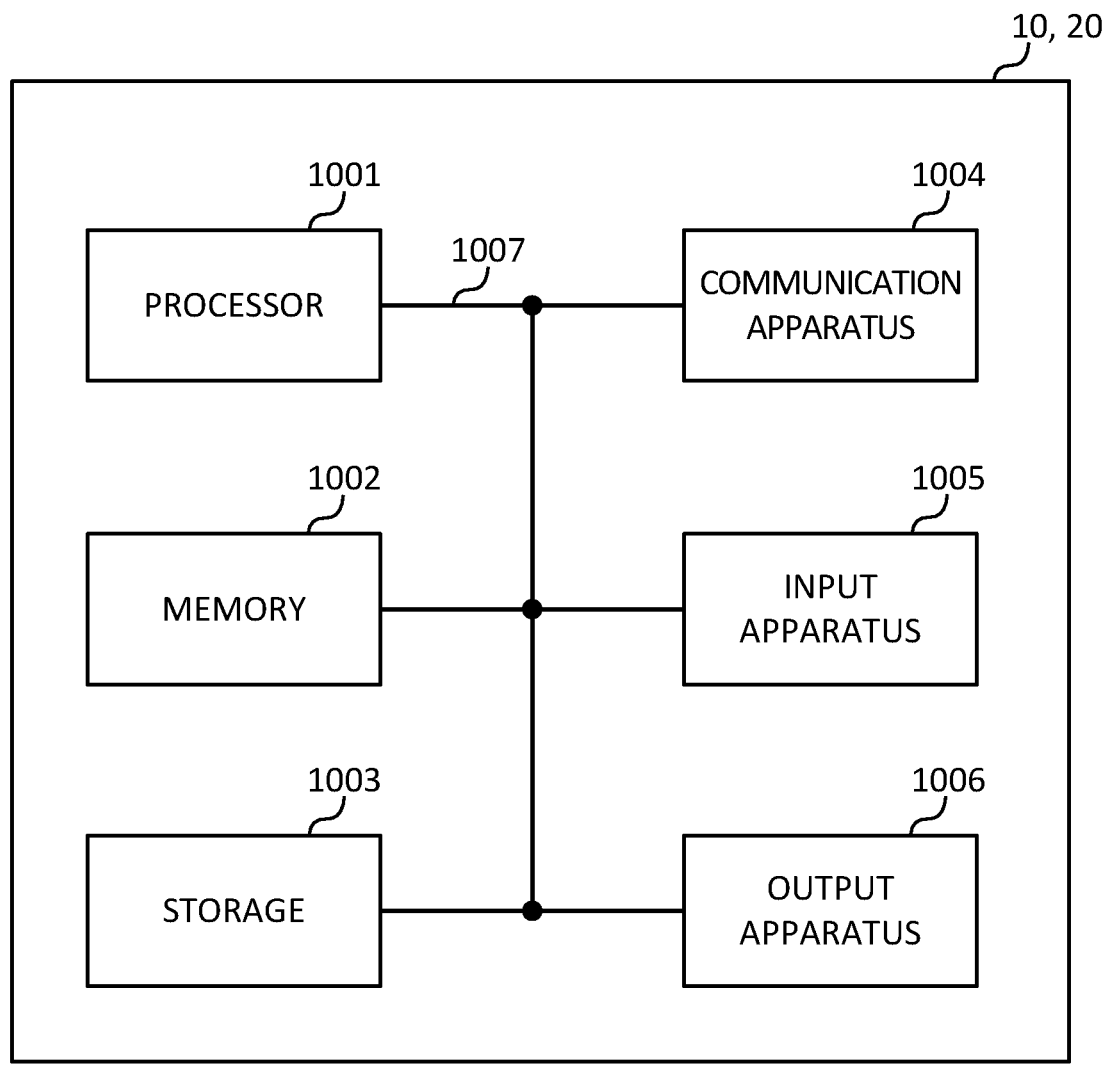
FIG. 13 is a drawing illustrating an exemplary hardware constitution of the radio base station and the user terminal according to the embodiment of the present invention of the present invention.

For example, the radio base station, the user terminal, and the like in the embodiment of the present invention may function as computers that perform the processes of the radio communication method of the present invention. FIG. 13 is a drawing illustrating an exemplary hardware constitution of the radio base station and the user terminal according to the embodiment of the present invention. The above-described radio base station 10 and user terminal 20 may be physically constituted as a computer apparatus including, for example, a processor 1001, a memory 1002, a storage 1003, a communication apparatus 1004, an input apparatus 1005, an output apparatus 1006, and a bus 1007.

In the following description, the word "an apparatus" can be reworded to, for example, a circuit, a device, and a unit. The hardware constitution of the radio base station 10 and the user terminal 20 may include one or more of each apparatus illustrated in the drawing, and may be constituted without a part of the apparatuses.

Each function in the radio base station 10 and the user terminal 20 is achieved such that the processor 1001 performs arithmetic operation such that predetermined software (program) is read into the hardware such as the processor 1001 and the memory 1002, to control communication by the communication apparatus 1004 and reading and/or writing of data in the memory 1002 and the storage 1003.

The processor 1001, for example, operates an operating system to control the computer as a whole. The processor 1001 may be constituted of a Central Processing Unit (CPU) including, for example, an interface with peripheral apparatuses, a control apparatus, an arithmetic apparatus, and a register. For example, the above-described baseband signal processing section 104 (204), call processing section 105, and the like may be implemented with the processor 1001.

The processor 1001 reads out a program (program code), a software module, and data from the storage 1003 and/or the communication apparatus 1004 to the memory 1002, and then performs various processes in accordance with them. As the program, a program that causes the computer to execute at least a part of the operation described in the above-described embodiment is used. For example, the control section 401 of the user terminal 20 may be stored in the memory 1002 to be achieved by a control program that operates in the processor 1001. Other function blocks may be similarly achieved.

The memory 1002, which is a computer readable recording medium, may be constituted of, for example, at least one of a Read Only Memory (ROM), an Erasable Programmable ROM (EPROM), and a Random Access Memory (RAM). The memory 1002 may be also referred to as, for example, a register, a cache, and a main memory (main storage unit). The memory 1002 can store, for example, a program (program code) and a software module executable for performing the radio communication method according to the one embodiment of the present invention.

The storage 1003, which is a computer readable recording medium, may be constituted of, for example, at least one of an optical disk such as a Compact Disc ROM (CD-ROM), a hard disk drive, a flexible disk, a magneto-optic disk, and a flash memory. The storage 1003 may be referred to as an auxiliary storage unit.

The communication apparatus 1004, which is hardware (transmitting/receiving device) for communicating between the computers via wired and/or radio network, is in other words, for example, a network device, a network controller, a network card, and a communication module. For example, the above-described transmitting/receiving antenna 101 (201), amplifying section 102 (202), transmitting/receiving section 103 (203), and transmission path interface 106 may be implemented with the communication apparatus 1004.

The input apparatus 1005 is an input device (for example, a keyboard and a computer mouse) that accepts input from outside. The output apparatus 1006 is an output device (for example, a display and a speaker) that performs an output to the outside. The input apparatus 1005 and the output apparatus 1006 may have an integral constitution (for example, a touch panel).

The respective apparatuses such as the processor 1001 and the memory 1002 are coupled by the bus 1007 for communicating information. The bus 1007 may be constituted of a single bus, and may be constituted of different buses between the apparatuses.

The radio base station 10 and the user terminal 20 may be constituted including the hardware such as a microprocessor, a Digital Signal Processor (DSP), an Application Specific Integrated Circuit (ASIC), a Programmable Logic Device (PLD), and a Field Programmable Gate Array (FPGA). This hardware may implement a part of or all the respective function blocks. For example, the processor 1001 may be implemented with at least one of this hardware.

The terms described in this description and/or the terms required for understanding this description may be replaced by terms having identical or similar meaning. For example, the channel and/or the symbol may be a signal (signaling). The signal may be a message. The Component Carrier (CC) may be also referred to as, for example, a cell, a frequency carrier, and a carrier frequency.

The radio frame may be constituted of one or more periods (frames) in the time domain. Each of this one or more periods (frames) that constitute the radio frame may be referred to as a sub-frame. Furthermore, the sub-frame may be constituted of one or more slots in the time domain. Furthermore, the slot may be constituted of one or more symbols (for example, OFDM symbols and SC-FDMA symbols) in the time domain.

The radio frame, the sub-frame, the slot, and the symbol each represent a time unit to transmit the signal. For the radio frame, the sub-frame, the slot, and the symbol, another name corresponding to each of them may be used. For example, one sub-frame may be referred to as a Transmission Time Interval (TTI), a plurality of consecutive sub-frames may be referred to as a TTI, and one slot may be referred to as a TTI. That is, the sub-frame or the TTI may be a sub-frame (1 ms) in the existing LTE, may be a period shorter than 1 ms (for example, one to 13 symbols), and may be a period longer than 1 ms.

Here, the TTI is, for example, a minimum time unit of scheduling in the radio communication. For example, in the LTE system, the radio base station performs scheduling that allocates the radio resource (for example, a frequency bandwidth and transmission power available for each user terminal) in a unit of TTI, with respect to each user terminal. The definition of the TTI is not limited to this.

The TTI with a time length of 1 ms may be referred to as, for example, a basic TTI (TTI in LTE Rel.8 to 12), a normal TTI, a long TTI, a basic sub-frame, a normal sub-frame, or a long sub-frame. The TTI shorter than the basic TTI may also be referred to as, for example, a reduced TTI, a short TTI, a reduced sub-frame, or a short sub-frame.

The Resource Block (RB), which is a resource allocation unit in the time domain and the frequency domain, may include one or more consecutive subcarriers in the frequency domain. The RB may include one or more symbols in the time domain, and may be a length of one slot, one sub-frame, or one TTI. One TTI and one sub-frame each may be constituted of one or more resource blocks. The RB may be referred to as, for example, a Physical Resource Block (Physical RB (PRB)), a PRB pair, and a RB pair.

The resource block may be constituted of one or more Resource Elements (REs). For example, one RE may be a radio resource region of one subcarrier and one symbol.

The above-described structures of the radio frame, the sub-frame, the slot, the symbol, and the like are only illustrative. For example, the number of the sub-frames included in the radio frame, the number of the slots included in the sub-frame, the number of the symbols and the RBs included in the slot, the number of the subcarriers included in the RB, and the constitution such as the number of the symbols, the symbol length, and the Cyclic Prefix (CP) length within the TTI can be variously changed.

For example, the information and the parameter described in this description may be represented by absolute values, may be represented by relative values from predetermined values, and may be represented by corresponding other information. For example, the radio resource may be instructed by a predetermined index.

For example, the information and the signal described in this description may be represented using any of various different techniques. For example, the data, the order, the command, the information, the signal, the bit, the symbol, and the chip mentionable over the above-described entire description may be represented by voltage, current, electromagnetic wave, magnetic field or magnetic particle, optical field or photon, or an optional combination of them.

For example, the software, the order, and the information may be transmitted and received via a transmission medium. For example, when the software is transmitted from a website, a server, or another remote source using wired techniques (for example, a coaxial cable, an optical fiber cable, a twisted pair, and a digital subscriber line (DSL)) and/or wireless (radio) techniques (for example, infrared and microwave), these wired techniques and/or wireless techniques are included in the definition of the transmission medium.

The radio base station in this description may be reworded to the user terminal. For example, the respective aspects/embodiments of the present invention may be applied to a constitution where the communication between the radio base station and the user terminal is replaced by communication between a plurality of user terminals (Device-to-Device (D2D)). In this case, the user terminal 20 may have the above-described functions that the radio base station 10 has. The words such as "uplink" and "downlink" may be reworded to "side." For example, the uplink channel may be reworded to the side channel.

Similarly, the user terminal in this description may be reworded to the radio base station. In this case, the radio base station 10 may have the above-described functions that the user terminal 20 has.

The respective aspects/embodiments described in this description may be used alone, may be used in combination, and may be used by switching in accordance with execution. The notification of the predetermined information (for example, the notification "being X") is not limited to explicit execution, and may be implicit execution (for example, by not performing the notification of this predetermined information).

The notification of the information is not limited to the aspects/embodiments described in this description, and may be performed by another method. For example, the notification of the information may be performed by physical layer signaling (for example, the Downlink Control Information (DCI) and the Uplink Control Information (UCI)), the upper layer signaling (for example, Radio Resource Control (RRC) signaling, the notification information (for example, the Master Information Block (MIB) and the System Information Block (SIB)), and the Medium Access Control (MAC) signaling), another signal, or these combination. The RRC signaling may be referred to as a RRC message, for example, and may be RRCConnectionSetup message and RRCConnectionReconfiguration message. The MAC signaling may be notified by, for example, a MAC Control Element (CE).

The respective aspects/embodiments described in this description may be applied to a system that uses Long Term Evolution (LTE), LTE-Advanced (LTE-A), LTE-Beyond (LTE-B), SUPER 3G IMT-Advanced, 4th generation mobile communication system (4G), 5th generation mobile communication system (5G), Future Radio Access (FRA), New Radio Access Technology (New-RAT), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and another appropriate radio communication method, and/or a next generation system extended based on them.

For, for example, the process procedure, the sequence, and the flowchart of the respective aspects/embodiments described in this description, the order may be interchanged without inconsistencies. For example, for the method described in this description, various step elements are presented in an exemplary order. The order is not limited to the presented specific order.

Now, although the present invention has been described in detail, it should be obvious to a person skilled in the art that the present invention is by no means limited to the embodiments described herein. For example, the above-described respective embodiments may be used alone, and may be used in combination. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

This application is based on Japanese Patent Application No. 2016-016193 filed on Jan. 29, 2016, and the disclosure of which is incorporated herein.

The invention claimed is:

1. A terminal comprising:
   a receiver that receives a synchronization signal configured for each carrier frequency of carrier frequencies used by the terminal and receives broadcast information corresponding to an index associated with the synchronization signal;
   a processor that determines information regarding the index associated with the synchronization signal based on an other signal that differs from the broadcast information, or on both the broadcast information and the other signal; and
   a transmitter that transmits a random access preamble by using a radio resource based on the index associated with the synchronization signal,
   wherein the synchronization signal is included in possible synchronization signals that can be selected by the index associated with the synchronization signal, and
   wherein the number of possible synchronization signals is decreased when the used carrier frequency is less than or equal to a value of a certain carrier frequency and is increased when the used carrier frequency is greater than the value of the certain carrier frequency.

2. The terminal according to claim 1, wherein the synchronization signal is transmitted on a corresponding beam per index associated with the synchronization signal.

3. The terminal according to claim 1, wherein the synchronization signal is transmitted using a different time resource per index associated with the synchronization signal.

4. A radio communication method for a terminal, comprising:
- receiving a synchronization signal configured for each carrier frequency of carrier frequencies used by the terminal and receiving broadcast information corresponding to an index associated with the synchronization signal;
- determining information regarding the index associated with the synchronization signal based on an other signal that differs from the broadcast information, or on both the broadcast information and the other signal; and
- transmitting a random access preamble by using a radio resource based on the index associated with the synchronization signal;
- wherein the synchronization signal is included in possible synchronization signals that can be selected by the index associated with the synchronization signal, and
- wherein the number of possible synchronization signals is decreased when the used carrier frequency is less than or equal to a value of a certain carrier frequency and is increased when the used carrier frequency is greater than the value of the certain carrier frequency.

5. The terminal according to claim 2, wherein the synchronization signal is transmitted using a different time resource per index associated with the synchronization signal.

6. A base station comprising:
- a transmitter that transmits a synchronization signal configured for each carrier frequency of carrier frequencies used by the base station and transmits broadcast information corresponding to an index associated with the synchronization signal;
- a processor that indicates information regarding the index associated with the synchronization signal based on an other signal that differs from the broadcast information, or on both the broadcast information and the other signal; and
- a receiver that receives a random access preamble by using a radio resource based on the index associated with the synchronization signal,
- wherein the synchronization signal is included in possible synchronization signals that can be selected by the index associated with the synchronization signal, and
- wherein the number of possible synchronization signals is decreased when the used carrier frequency is less than or equal to a value of a certain carrier frequency and is increased when the used carrier frequency is greater than the value of the certain carrier frequency.

7. A system comprising a terminal and a base station, wherein:
- the terminal comprises:
  - a first receiver that receives a synchronization signal configured for each carrier frequency of carrier frequencies used by the system and receives broadcast information corresponding to an index associated with the synchronization signal;
  - a first processor that determines information regarding the index associated with the synchronization signal based on an other signal that differs from the broadcast information, or on both the broadcast information and the other signal; and
  - a first transmitter that transmits a random access preamble by using a radio resource based on the index associated with the synchronization signal,
- the base station comprises:
  - a second transmitter that transmits the synchronization signal and the broadcast information;
  - a second processor that indicates the information regarding the index associated with the synchronization signal; and
  - a second receiver that receives the random access preamble by using the radio resource,
- wherein the synchronization signal is included in possible synchronization signals that can be selected by the index associated with the synchronization signal, and
- wherein the number of possible synchronization signals is decreased when the used carrier frequency is less than or equal to a value of a certain carrier frequency and is increased when the used carrier frequency is greater than the value of the certain carrier frequency.

* * * * *